US012321836B2

(12) United States Patent
Okamoto

(10) Patent No.: US 12,321,836 B2
(45) Date of Patent: Jun. 3, 2025

(54) LEARNING DEVICE, LEARNING METHOD, LEARNING PROGRAM, EVALUATION DEVICE, EVALUATION METHOD, AND EVALUATION PROGRAM

(71) Applicant: Actapio, Inc., East Wenatchee, WA (US)

(72) Inventor: Shinichiro Okamoto, East Wenatchee, WA (US)

(73) Assignee: Actapio, Inc., East Wenatchee, WA (US)

( * ) Notice: Subject to any disclaimer, the term of this patent is extended or adjusted under 35 U.S.C. 154(b) by 1114 days.

(21) Appl. No.: 17/178,998

(22) Filed: Feb. 18, 2021

(65) Prior Publication Data

US 2021/0264264 A1 Aug. 26, 2021

Related U.S. Application Data

(60) Provisional application No. 62/980,017, filed on Feb. 21, 2020.

(51) Int. Cl.

| G06N 20/10 | (2019.01) |
| G06F 18/21 | (2023.01) |
| G06F 18/214 | (2023.01) |
| G06N 3/08 | (2023.01) |
| G06V 10/764 | (2022.01) |
| G06V 10/776 | (2022.01) |
| G06V 10/82 | (2022.01) |

(52) U.S. Cl.
CPC .......... *G06N 20/10* (2019.01); *G06F 18/214* (2023.01); *G06F 18/217* (2023.01); *G06N 3/08* (2013.01); *G06V 10/764* (2022.01); *G06V 10/776* (2022.01); *G06V 10/82* (2022.01)

(58) Field of Classification Search
CPC .......... G06N 20/10; G06N 3/08; G06N 3/044; G06N 3/045; G06N 3/12; G06F 18/214; G06F 18/217; G06V 10/764; G06V 10/776; G06V 10/82

See application file for complete search history.

(56) References Cited

U.S. PATENT DOCUMENTS

2018/0300465 A1* 10/2018 Esman ................ G06N 3/082
2020/0342328 A1* 10/2020 Revaud ............... G06F 18/22

FOREIGN PATENT DOCUMENTS

JP 2019-164793 A 9/2019

\* cited by examiner

*Primary Examiner* — Hope C Sheffield
(74) *Attorney, Agent, or Firm* — PROCOPIO, CORY, HARGREAVES & SAVITCH LLP

(57) ABSTRACT

A learning device according to the present application includes a generation unit that generates, from a plurality of values indicating features of a predetermined target and indicating different types of a plurality of features, a value corresponding to a set of the types of the features, and a learning unit that causes a model to learn a feature of the predetermined target using a value generated by the generation unit.

8 Claims, 12 Drawing Sheets

FIG.4

| LEARNING DATA ID | LEARNING DATA | | ... |
|---|---|---|---|
| LEARNING DATA #1 | LABEL #1-1 | DATA #1-1 | ... | ... |
| | LABEL #1-2 | DATA #1-2 | ... | ... |
| | ... | ... | ... | ... |
| LEARNING DATA #2 | LABEL #2-1 | DATA #2-1 | ... | ... |
| | LABEL #2-2 | DATA #2-2 | ... | ... |
| | ... | ... | ... | ... |
| ... | ... | ... | ... | ... |

| CONDITION ID | CONTENT OF CONDITIONS | | | INDEX CANDIDATE | ... |
|---|---|---|---|---|---|
| | CONTENT CONDITION | TENDENCY CONDITION | ... | | |
| CONDITION ID #1 | INTEGER | DENSITY > THRESHOLD VALUE | ... | GENERATION INDEX #1 | ... |
| CONDITION ID #2 | INTEGER | DENSITY ≤ THRESHOLD VALUE | ... | GENERATION INDEX #2 | ... |
| ... | ... | ... | ... | ... | ... |

~32

LEARNING DEVICE, LEARNING METHOD, LEARNING PROGRAM, EVALUATION DEVICE, EVALUATION METHOD, AND EVALUATION PROGRAM

CROSS-REFERENCE TO RELATED APPLICATIONS

This application is a claims priority to U.S. Provisional Application No. 62/980,017 filed Feb. 21, 2020, the contents of which are incorporated herein by reference.

BACKGROUND OF THE INVENTION

1. Field of the Invention

The present invention relates to a learning device, a learning method, a learning program, an evaluation device, an evaluation method, and an evaluation program.

2. Description of the Related Art

In recent years, a technique has been proposed in which various models such as SVM (Support vector machine) and DNN (Deep Neural Network) are caused to learn features of learning data to make various predictions and classifications. As an example of such a learning method, a technique of dynamically changing the learning mode of the learning data according to hyperparameter values or the like has been proposed.
[Patent Literature 1] JP 2019-164793 A

SUMMARY OF THE INVENTION

However, there is a need for improving the accuracy of a model in the technique described above.

However, there is a need for improving the accuracy of a model in the technique described above. For example, the learning data that is the target of feature learning is only dynamically changed according to hyperparameter values or the like in the example described above. For this reason, if the hyperparameter values are not appropriate, it may not be possible to improve the accuracy of the model.

Further, it is known that the accuracy of the model changes depending on the value of the learning data, the features of the learning data, which features are learned, or the like. In addition, the accuracy of the model also changes depending on the learning mode in which the model learns the learning data, that is, the learning mode indicated by the hyperparameters. Consequently, it is not easy to select the optimum element for learning a model according to the purpose of a user among such many elements.

According to one aspect of the embodiment, the accuracy of the model can be improved.

BRIEF DESCRIPTION OF THE DRAWINGS

FIG. 4 is a table illustrating an example of information registered in a learning database according to the embodiment;

FIG. 5 is a table illustrating an example of information registered in a generation condition database according to the embodiment;

DETAILED DESCRIPTION OF THE PREFERRED EMBODIMENTS

Figure 1:
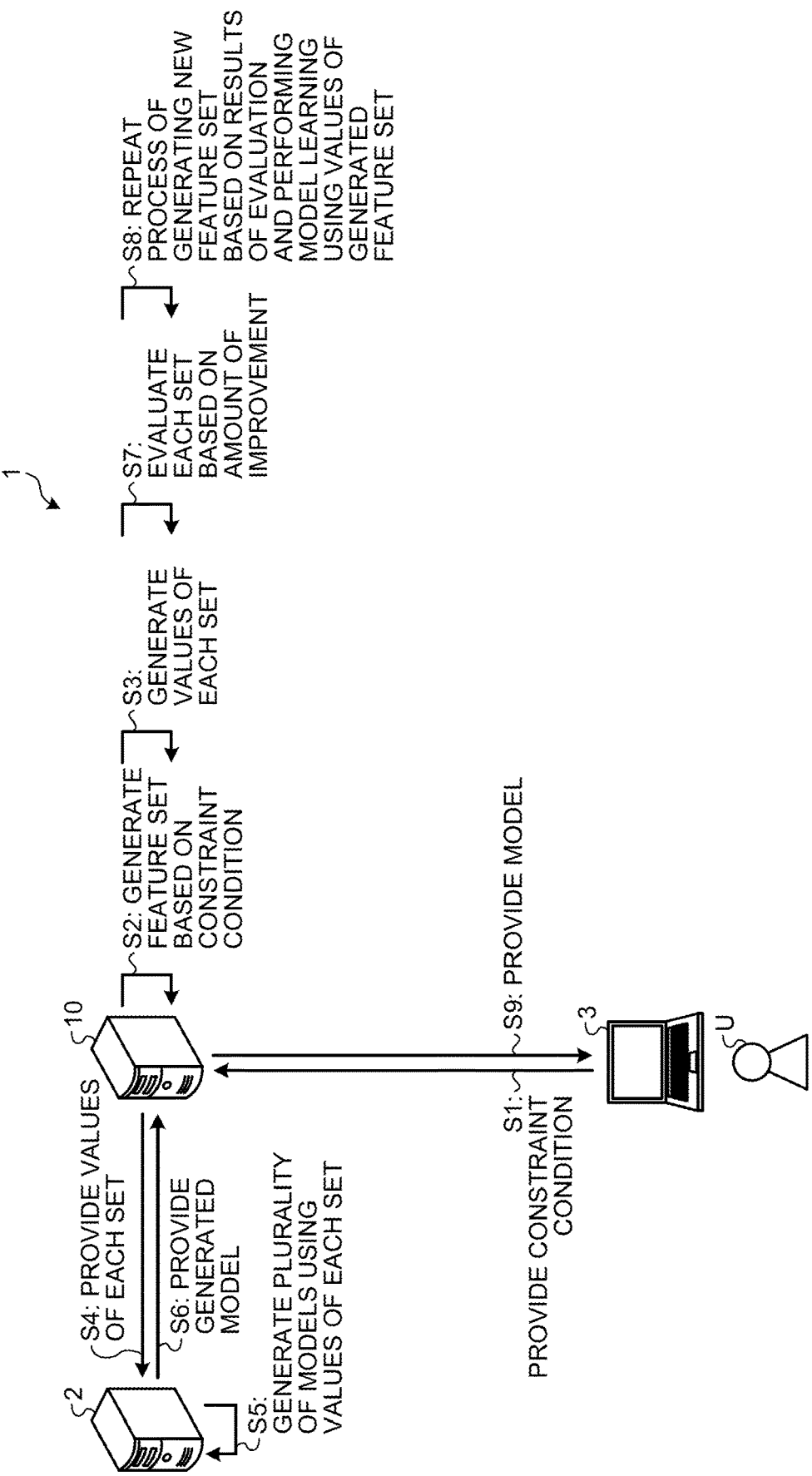
FIG. 1 is a diagram illustrating an example of a process performed by an information providing device according to an embodiment.

Hereinafter, modes for implementing a learning device, a learning method, a learning program, an evaluation device, an evaluation method, and an evaluation program according to the present application (hereinafter, referred to as "embodiments") will be described in detail with reference to the drawings. The embodiments do not limit the learning device, learning method, learning program, evaluation device, evaluation method, and evaluation program according to the present application. In addition, the respective embodiments can be appropriately combined within a range that does not contradict the processing contents. Further, in each of the following embodiments, the same parts are designated by the same reference numerals, and duplicate description is omitted.

1. INFORMATION PROVIDING DEVICE

First, an example of a process performed by an information providing device 10 that is an example of the learning device and the evaluation device will be described with reference to FIG. 1. FIG. 1 is a diagram illustrating an example of a process performed by an information providing device according to an embodiment. An example of an information providing system 1 having the information providing device 10 is illustrated in FIG. 1.

[1-1. Configuration of Information Providing System]

As illustrated in FIG. 1, the information providing system 1 includes the information providing device 10, a model generation server 2, and a terminal device 3. The information providing system 1 may have a plurality of the model generation servers 2 and a plurality of the terminal devices 3. In addition, the information providing device 10 and the model generation server 2 may be implemented by the same server device, cloud system, or the like. Here, the information providing device 10, the model generation server 2, and the terminal device 3 are communicably connected through a network N (see, for example, FIG. 36) by wire or wirelessly.

The information providing device 10 is an information processing device that performs an index generation process of generating a generation index, which is an index (that is, model recipe) in model generation, and a model generation process of generating a model according to the generation index, and provides the generated generation index and the generated model, and is implemented by, for example, a server device or a cloud system.

The information providing device 10 also performs a learning process of treating a set of a plurality of features of a certain target (hereinafter, referred to as "feature set") as one feature, generating a value corresponding to the feature set (that is, value indicating set of features of target), and performing model learning using the generated value, and an evaluation process of evaluating the feature set based on the results of the learning process.

The model generation server 2 is a generation device that generates a model having learned the features of learning data, and is implemented by, for example, a server device or a cloud system. For example, when receiving a config file such as the type and behavior of a model to be generated and how to learn the features of the learning data as a model generation index, the model generation server 2 automatically generates a model according to the received config file. The model generation server 2 may perform model learning by using any model learning method. Alternatively, for example, the model generation server 2 may be various existing services such as AutoML.

The terminal device 3 is a terminal device used by a user U, and is implemented by, for example, a PC (Personal Computer), a server device, or the like. For example, the terminal device 3 causes the information providing device 10 to generate a model generation index through communication with the information providing device 10, and acquires a model generated by the model generation server 2 according to the generated generation index.

[1-2. Overview of Index Generation Process and Model Generation Process Performed by Information Providing Device 10]

Before the learning process and the evaluation process are described, the index generation process and the model generation process performed by the information providing device 10 will be described below. The index generation process and the model generation process are not essential processes in the information providing device 10 that operates as a learning device and an evaluation device.

First, the information providing device 10 receives an indication of learning data used to cause a model to learn features from the terminal device 3. For example, the information providing device 10 stores various learning data used for learning in a predetermined storage device, and receives an indication of learning data specified by the user U as the learning data. The information providing device 10 may acquire learning data used for learning from, for example, the terminal device 3 or various external servers.

Any data can be adopted as learning data. For example, the information providing device 10 uses, as learning data, various information related to users, such as the history of each user's position, the history of web contents browsed by each user, the history of purchases by each user, and the history of search queries by each user. The information providing device 10 may also use the demographic attribute, psychographic attribute, or the like of users as the learning data. The information providing device 10 may also use metadata such as the types, contents, and creators of various web contents to be distributed as the learning data.

In such a case, the information providing device 10 generates candidates for a generation index based on the statistical information of learning data used for learning. For example, the information providing device 10 generates candidates for a generation index indicating which model and which learning method should be used for learning based on the features of values included in the learning data. In other words, the information providing device 10 generates a model capable of learning the features of learning data with high accuracy or a learning method for causing the model to learn the features with high accuracy as a generation index. That is, the information providing device 10 optimizes the learning method.

Next, the information providing device 10 provides the candidates for the generation index to the terminal device 3. In such a case, the user U modifies the candidates for the generation index according to a preference, a rule-of-thumb, or the like. The information providing device 10 then provides the candidates for each generation index and the learning data to the model generation server 2.

Meanwhile, the model generation server 2 generates a model for each generation index. For example, the model generation server 2 causes a model with the structure indicated by the generation index to learn the features of the learning data by the learning method indicated by the generation index. The model generation server 2 then provides the generated model to the information providing device 10.

Here, it is assumed that each model generated by the model generation server 2 has a difference in accuracy due to a difference in the generation index. The information providing device 10 thus generates a new generation index by a genetic algorithm based on the accuracy of each model, and repeatedly generates a model using the newly generated generation index.

For example, the information providing device 10 divides the learning data into evaluation data and learning data, and acquires a plurality of models that have learned the features of the learning data and are generated according to different generation indexes. For example, the information providing device 10 generates ten generation indexes, and generates ten models by using these ten generation indexes generated and the learning data. In such a case, the information providing device 10 measures the accuracy of each of the ten models using the evaluation data.

Next, the information providing device 10 selects a predetermined number of models (for example, five models) in order from the one with the highest accuracy among the ten models. The information providing device 10 then generates a new generation index from the generation indexes adopted when the five selected models are generated. For example, the information providing device 10 treats each generation index as an individual of a genetic algorithm, and treats the model type, model structure, and various learning methods (that is, various indexes indicated by generation index) indicated by each generation index as genes in the genetic algorithm. The information providing device 10 then newly generates ten generation indexes for the next generation by selecting individuals for gene crossover and crossing the genes. The information providing device 10 may take consider mutation into consideration in gene crossover. In addition, the information providing device 10 may randomly select genes subjected to two-point crossover, multi-point crossover, uniform crossover, and crossover. The information providing device 10 may adjust the crossover rate at the time of crossing so that, for example, the genes of an individual with higher model accuracy are inherited by an individual in the next generation.

In addition, the information providing device 10 generates ten new models again using the generation indexes in the next generation. The information providing device 10 then generates a new generation index by the genetic algorithm described above based on the accuracy of the new ten models. By repeatedly performing such a process, the information providing device 10 can bring the generation index closer to the generation index according to the features of the learning data, that is, the optimized generation index.

Further, when a predetermined condition is satisfied, for example, when a new generation index is generated a predetermined number of times, or when the maximum value, average value, or minimum value of the accuracy of a model exceeds a predetermined threshold value, the information providing device 10 selects the model with the highest accuracy as a provision target. The information providing device 10 then provides the corresponding generation index and the selected model to the terminal device 3. As a result of such a process, the information providing device 10 can generate a generation index of an appropriate model and provide a model according to the generated generation index only by selecting learning data from the user.

The information providing device 10 achieves the gradual optimization of the generation index by using the genetic algorithm in the example described above, but the embodiment is not limited thereto. As will be clear in the description later, the accuracy of the model largely changes depending on not only the features of the model itself such as the type and structure of the model, but also the index at the time of generating a model (that is, at time of learning features of learning data) such as which learning data is input to which model or which hyperparameters are used for model learning.

Consequently, the information providing device 10 does not need to perform optimization using the genetic algorithm as long as the information providing device 10 generates a generation index estimated to be optimal according to the learning data. For example, the information providing device 10 may present a generation index generated according to whether or not the learning data satisfies various conditions generated based on a rule-of-thumb to the user, and generate a model according to the presented generation index. When receiving a modification of the presented generation index, the information providing device 10 may generate a model according to the received modified generation index, present the accuracy of the generated model or the like to the user, and receive a modification of the generation index again. That is, the information providing device 10 may cause the user U to try and error the optimum generation index.

[1-3. Generation of Generation Index]

Regarding which generation index is generated for which learning data, any various techniques can be adopted. In the following description, an example of a generation index generated by the information providing device 10 will be schematically described, but the embodiment is not limited thereto.

[1-3-1. Generation Index]

An example of information indicated by a generation index will be described first. For example, when a model is caused to learn the features of learning data, it is assumed that the mode of inputting the learning data to the model and the mode of the model, and the learning mode of the model (that is, features indicated by hyperparameters) contribute to the accuracy of the resultant model. The information providing device 10 thus improves the accuracy of the model by generating a generation index that optimizes each mode according to the features of the learning data.

For example, it is assumed that the learning data includes data with various labels, that is, data indicating various features. However, if the data indicating features that are not useful for data classification is used as the learning data, the accuracy of the resultant model may be degraded. Consequently, the information providing device 10 determines the features of input learning data as the mode of inputting the learning data to the model. For example, the information providing device 10 determines which label-attached data is input (that is, which feature-applied data) among the learning data. In other words, the information providing device 10 optimizes a combination of features to be input.

Further, it is assumed that the learning data includes columns in various formats such as data containing only numerical values and data containing character strings. When such learning data is input to the model, it is also assumed that the accuracy of the model changes depending on whether the data is input as it is or converted into data in another format. For example, when a plurality of types of learning data (learning data indicating different features) are provided and a piece of learning data containing character strings and a piece of learning data containing numerical values are input, it is assumed that the accuracy of the model changes depending on whether the character string and the numerical value are input as they are, the character string is converted into a numerical value and only the numerical value is input, or the numerical value is treated as a character string and input. The information providing device 10 thus determines the format of the learning data to be input to the model. For example, the information providing device 10 determines whether the learning data to be input to the model is a numerical value or a character string. In other words, the information providing device 10 optimizes the column type of the feature to be input.

In addition, when pieces of learning data indicating different features are present, it is assumed that the accuracy of the model changes depending on which combination of features is input at the same time. That is, when pieces of learning data indicating different features are present, it is assumed that the accuracy of the model changes depending on which combination of features is learned (that is, relationship between combinations of features). For example, when a piece of learning data indicating a first feature (for example, gender), a piece of learning data indicating a second feature (for example, address), and a piece of learning data indicating a third feature (for example, purchase history) are present, it is assumed that the accuracy of the model changes depending on whether the piece of the learning data indicating the first feature and the piece of the learning data indicating the second feature are input at the same time, or the piece of the learning data indicating the first feature and the piece of the learning data indicating the third feature are input at the same time. Consequently, the information providing device 10 optimizes a combination of features (cross features) that causes the model to learn the relationship.

Here, various models project the input data into a space of a predetermined dimension that is divided by a predetermined hyperplane, and classify the input data depending on which space of the divided spaces the projected position belongs to. For this reason, if the number of dimensions of the space into which the input data is projected is lower than the optimum number of dimensions, the ability to classify the input data is degraded, and as a result, the accuracy of the model is degraded accordingly. Alternatively, if the number of dimensions of the space into which the input data is projected is higher than the optimum number of dimensions, the internal product value with the hyperplane changes, and as a result, data different from the data used for learning cannot be appropriately classified. The information providing device 10 thus optimizes the number of dimensions of the input data to the model. For example, the information providing device 10 optimizes the number of dimensions of the input data by controlling the number of nodes in an input layer of the model. In other words, the information providing device 10 optimizes the number of dimensions of the space into which the input data is embedded.

The model includes, in addition to the SVM, a neural network having a plurality of intermediate layers (hidden layers) and the like. In addition, various neural networks such as a feed-forward DNN that transmits information from an input layer to an output layer in one direction, a convolutional neural network (CNN) that convolves information in an intermediate layer, a recurrent neural network (RNN) having a directed cycle path, and a Boltzmann machine are known as such a neural network. Such various neural networks also include an LSTM (Long short-term memory) and various other neural networks.

When the types of models that learn various features of learning data are different from each other as described above, it is assumed that the accuracy of the model changes. The information providing device 10 thus selects a model type that is estimated to learn the features of the learning data with high accuracy. For example, the information providing device 10 selects the model type according to what type of label is attached as the label of the learning data. To give a more specific example, when the data with a term related to "history" as a label is present, the information providing device 10 selects an RNN that is assumed to be able to better learn the features of the history, and when the data with a term related to "image" as a label is present, the information providing device 10 selects a CNN that is assumed to be able to better learn the features of the image. In addition to these, the information providing device 10 may determine whether or not the label is a term specified in advance or a term similar to the term, and select a model type that is previously associated with the term determined to be identical or similar.

In addition, if the number of intermediate layers of the model or the number of nodes included in one intermediate layer changes, it is assumed that the learning accuracy of the model changes. For example, if the model has a large number of intermediate layers (deep model), it may be possible to achieve classification according to more abstract features, while local errors in backpropagation are difficult to propagate to an input layer. As a result, there is a risk that learning cannot be performed properly. Alternatively, if there are a small number of nodes included in the intermediate layer, a higher level of abstraction can be performed, but if the number of nodes is too small, the information necessary for classification is likely to be lost. The information providing device 10 thus optimizes the number of the intermediate layers and the number of nodes included in the intermediate layer. That is, the information providing device 10 optimizes a model architecture.

In addition, it is assumed that the accuracy of the nodes changes depending on the presence or absence of attention, whether or not the nodes included in the model are autoregressive nodes, and which nodes are connected to each other. The information providing device 10 thus optimizes the network such as whether or not autoregression is present and which nodes are connected to each other.

In model learning, the optimization method (algorithm used in learning), dropout rate, node activation function, number of units, and the like of the model are set as hyperparameters. It is assumed that the accuracy of the model also changes when such hyperparameters change. The information providing device 10 thus optimizes the learning mode of model learning, that is, the hyperparameters.

The accuracy of the model also changes when the size of the model (number of input layers, intermediate layers, or output layers and number of nodes) changes. Consequently, the information providing device 10 also optimizes the size of the model.

As described above, the information providing device 10 optimizes the indexes for generating the various models described above. For example, the information providing device 10 holds in advance the conditions corresponding to the respective indexes. These conditions are set by a rule-of-thumb such as the accuracy of various models generated from learning models in the past. The information providing device 10 then determines whether or not the learning data satisfies each condition, and adopts an index previously associated with the condition that is satisfied or not satisfied by the learning data as a generation index (or candidate thereof). As a result, the information providing device 10 can generate a generation index that allows the features of the learning data to be accurately learned.

As described above, when the process of automatically generating a generation index from learning data and creating a model according to the generation index is automatically performed, a user does not need to determine what type of distribution the data has by referring to the content of the learning data. As a result, the information providing device 10 can reduce the time and effort for a data scientist or the like to recognize learning data when creating a model, and can prevent the privacy from being invaded when the learning data is recognized.

[1-3-2. Generation Index According to Data Type]

Hereinafter, an example of conditions for generating a generation index will be described. An example of conditions based on what type of data is adopted as learning data will be described first.

For example, the learning data used for learning includes integers, floating points, character strings, and the like as data. For this reason, when an appropriate model for the format of input data is selected, it is estimated that the learning accuracy of the model will be higher. The information providing device 10 thus generates a generation index based on whether the learning data is an integer, a floating point, or a character string.

For example, when the learning data is an integer, the information providing device 10 generates a generation index based on the continuity of the learning data. For example, when the density of the learning data exceeds a predetermined first threshold value, the information providing device 10 determines the learning data as continuous data, and generates a generation index based on whether or not the maximum value of the learning data exceeds a predetermined second threshold value. Alternatively, when the density of the learning data is lower than the predetermined first threshold value, the information providing device 10 determines the learning data as sparse data, and generates a generation index based on whether or not the number of unique values included in the learning data exceeds a predetermined third threshold value.

A more specific example will be described. In the following example, an example of a process of selecting, as a generation index, a feature function from config files to be transmitted to the model generation server 2 that automatically generates a model by AutoML will be described. For example, when the learning data is an integer, the information providing device 10 determines whether or not the density of the learning data exceeds a predetermined first threshold value. For example, the information providing device 10 calculates, as the density, a value by dividing the number of unique values included in the learning data by the value obtained by adding 1 to the maximum value of the learning data.

Next, when the density exceeds the predetermined first threshold value, the information providing device 10 determines the learning data as continuous data, and determines whether or not the value obtained by adding 1 to the maximum value of the learning data exceeds a second threshold value. When the value obtained by adding 1 to the maximum value of the learning data exceeds the second threshold value, the information providing device 10 selects "Categorical_colum_with_identity & embedding_column" as the feature function. On the other hand, when the value obtained by adding 1 to the maximum value of the learning data is lower than the second threshold value, the information providing device 10 selects "Categorical_column_with_identity" as the feature function.

On the other hand, when the density is lower than the predetermined first threshold value, the information providing device 10 determines the learning data as sparse data, and determines whether or not the number of unique values included in the learning data exceeds a predetermined third threshold value. When the number of unique values included in the learning data exceeds the predetermined third threshold value, the information providing device 10 selects "Categorical_column_with_hash_bucket & embedding_column" as the feature function, and selects "Categorical_column_with_hash bucket" as the feature function when the number of unique values included in the learning data is lower than the predetermined third threshold.

When the learning data is a character string, the information providing device 10 generates a generation index based on the number of types of character strings included in the learning data. For example, the information providing device 10 counts the number of unique character strings (number of pieces of unique data) included in the learning data, and when the counted number is lower than a predetermined fourth threshold value, the information providing device 10 selects "categorical_column_with_vocabulary_list" or/and "categorical_column_with_vocabulary file" as the feature function. Alternatively, when the counted number is lower than a fifth threshold value that is larger than the predetermined fourth threshold value, the information providing device 10 selects "categorical_column_with_vocabulary file & embedding_column" as the feature function. Alternatively, when the counted number exceeds the fifth threshold value that is larger than the predetermined fourth threshold value, the information providing device 10 selects "categorical_column_with_hash_bucket & embedding column" as the feature function.

When the learning data is a floating point, the information providing device 10 generates an index to convert the learning data into input data to be input to the model as a model generation index. For example, the information providing device 10 selects "bucketized column" or "numeric_colum" as the feature function. That is, the information providing device 10 bucketizes (groups) the learning data, and selects whether the bucket number is input or the numerical value is directly input. The information providing device 10 may bucketize the learning data so that, for example, the numerical value ranges associated with the respective buckets are substantially the same. For example, the information providing device 10 may associate the numerical value range with each bucket so that substantially the same number of pieces of the learning data is classified into each bucket. Alternatively, the information providing device 10 may select the number of buckets or the range of a numerical value associated with a bucket as the generation index.

In addition, the information providing device 10 acquires learning data indicating a plurality of features, and generates a generation index indicating a feature to be learned by the model among the features of the learning data as the model generation index. For example, the information providing device 10 determines which label of learning data is input to the model, and generates a generation index indicating the determined label. Alternatively, the information providing device 10 generates a generation index indicating a plurality of types for causing the model to learn correlation among the types of the learning data, as the model generation index. For example, the information providing device 10 determines a combination of labels to be input to the model at the same time, and generates a generation index indicating the determined combination.

Further, the information providing device 10 generates a generation index indicating the number of dimensions of learning data to be input to the model as the model generation index. For example, the information providing device 10 may determine the number of nodes in the input layer of the model according to the number of unique data included in the learning data, the number of labels to be input to the model, the combination of the number of labels to be input to the model, the number of buckets, and the like.

Further, the information providing device 10 generates a generation index indicating the type of a model that is made to learn the features of the learning data as the model generation index. For example, the information providing device 10 determines the type of a model to be generated according to the density and sparseness of learning data that has been learned in the past, the content of labels, the number of labels, the number of combinations of labels, and the like, and generates a generation index indicating the determined type. For example, the information providing device 10 generates generation indexes that indicate "BaselineClassifier", "LinearClassifier", "DNNClassifier", "DNNLinearCombinedClassifier", "BoostedTreesClassifier", "AdaNetClassifier", "RNNClassifier", "DNNResNetClassifier", "AutoIntClassifier", and the like as classes of a model in AutoML.

The information providing device 10 may generate a generation index indicating various independent variables of the model in each of these classes. For example, the information providing device 10 may generate a generation index indicating the number of intermediate layers of the model or the number of nodes included in each layer as the model generation index. Alternatively, the information providing device 10 may generate a generation index indicating the connection mode between the nodes of the model or a generation index indicating the size of the model as the model generation index. These independent variables are appropriately selected depending on whether or not various statistical features of the learning data satisfy a predetermined condition.

Alternatively, the information providing device 10 may generate a generation index indicating a learning mode in which the model learns the features of the learning data, that is, hyperparameters as the model generation index. For example, the information providing device 10 may generate a generation index indicating "stop_if_no_decrease_hook", "stop_if_no_increase_hook", "stop_if_higher_hook", or "stop_if_lower_hook" in setting the learning mode in AutoML.

That is, the information providing device 10 generates the generation index indicating the features of the learning data to be learned by the model, the mode of the model to be generated, or the learning mode in which the model learns the features of the learning data, based on the labels of the learning data used for learning and the features of the data itself. More specifically, the information providing device 10 generates a config file for controlling the generation of the model in AutoML.

[1-3-3. Order of Determining Generation Index]

Here, the information providing device 10 may optimize the various indexes described above in parallel or in an appropriate order. Alternatively, the information providing device 10 may set the order of optimizing the respective indexes to be changeable. That is, the information providing device 10 may receive the specification of the order of determining the features of the learning data to be learned by the model, the mode of the model to be generated, and the learning mode in which the model learns the features of the learning data from a user, and determine the indexes in the received order.

For example, when the generation index starts to be generated, the information providing device 10 optimizes input features such as the features of learning data to be input and the mode of inputting the learning data, and then optimizes input feature crosses as to which combination of features is learned. The information providing device 10 then selects a model and optimizes the structure of the model. After that, the information providing device 10 optimizes hyperparameters and ends the generation of the generation index.

In optimizing input features, the information providing device 10 may select and modify various input features such as the features and input mode of the learning data to be input, and select a new input feature using a genetic algorithm to repeatedly optimize the input features. Similarly, in optimizing input feature crosses, the information providing device 10 may repeatedly optimize the input feature crosses, or may repeatedly optimize the model selection and the model structure. The information providing device 10 may also repeatedly optimize the hyperparameters. The information providing device 10 may also repeatedly perform a series of processes such as the optimization of input features, the optimization of input feature crosses, the model selection, the model structure optimization, and the optimization of hyperparameters to optimize each index.

For example, the information providing device 10 may perform the model selection and the model structure optimization after the optimization of hyperparameters, or may perform the optimization of input features and the optimization of input feature crosses after the model selection and the model structure optimization. Further, the information providing device 10 repeatedly performs the optimization of input features and then repeatedly performs the optimization of input feature crosses, for example. After that, the information providing device 10 may repeatedly perform the optimization of input features and the optimization of input feature crosses. As described above, any setting can be adopted for which index is optimized in which order and which optimization process is repeatedly performed in the optimization.

[1-4. Overview of Learning Process and Evaluation Process Performed by Information Providing Device 10]

Next, an overview of the learning process and the evaluation process performed by the information providing device 10 will be described. As described above, it is known that the accuracy of models such as DNN changes depending on the type and format of input data.

Here, it is known that the accuracy of the model is improved when the size of the model is increased or the number of data types to be input is increased. However, it is known that such improvement in accuracy varies depending on the model type and the process to be performed by the model. For example, in a conventional model such as SVM, it is known that even if the size of the model is increased or the number of data types is increased, the accuracy cannot be improved (saturation occurs). Also in a model with a plurality of hidden layers (intermediate layers) such as DNN, it is known that the accuracy improves in tasks such as image classification, utterance classification, and language translation when the size of the model and the number of data types are increased. However, it is known that in prediction tasks such as recommendation and CTR (Click Through Rate), saturation is likely to occur even if the size of the model and the number of data types are increased.

In view of these problems, the applicant has discovered that the accuracy of the model can be improved by newly setting features in which a plurality of features of learning data are combined. For example, it is assumed that learning data that indicates various attributes of a user as features is provided. It is assumed that such learning data includes data indicating a "gender" of a user as a feature and data indicating a "place of residence" of the user as a feature.

Here, when the model is caused to learn the data indicating the "gender" of the user as the feature and the data indicating the "place of residence" of the user as the feature as individual data, it is assumed that the model learns the features of the data by treating each feature as an individual feature. For example, it is assumed that the model uses the "gender" of the user and the "place of residence" of the user individually to project the data to any position on a Hilbert space. However, when the features are used individually as described above, it may not be possible to obtain a model that appropriately classifies users. In other words, when the features are used individually, it may not be possible to set a hyperplane that properly classifies data (for example, hyperplane that can linearly classify data) on the Hilbert space.

For example, it is assumed that the data indicating "gender" is data that classifies users into two classes, that is, "male" and "female", and the data indicating "place of residence" is data that classifies users into two classes, that is, "living in Tokyo" and "living in place other than Tokyo". When such pieces of data of the features are used individually, it is assumed that the model projects the data of "male" users and the data of "female" users to different areas on the Hilbert space, and projects the data of users "living in Tokyo" and the data of users "living in place other than Tokyo" to different areas on the Hilbert space.

However, when the model is evaluated from the viewpoint of combinations of features such as "male living in Tokyo", "male living in place other than Tokyo", "female living in Tokyo", and "female living in place other than Tokyo", the accuracy may not be high. For example, when the number of dimensions of the Hilbert space is large, the model individually using the features may project the data of a user who is "male living in Tokyo" and the data of a user who is "female living in Tokyo" to positions separated from each other on the Hilbert space, but project the data of the user who is "male living in Tokyo" and the data of a user who is "male living in place other than Tokyo" to close positions on the Hilbert space.

For this reason, when the prediction targets of the model are ones in which "gender" and "place of residence" are combined with high relevance, such as "male living in Tokyo", "male living in place other than Tokyo", "female living in Tokyo", and "female living in place other than Tokyo", the model that has performed learning using "gender" and "place of residence" individually cannot properly classify user data. In addition, such classification problems may become more pronounced as the number of dimensions of the Hilbert space onto which the model projects data increases.

Meanwhile, when the prediction targets of the model are ones in which "gender" and "place of residence" are combined with high relevance, it is assumed that the accuracy of the model can be improved by generating a value indicating a combination of "gender" and "place of residence" as learning data and performing model learning using the generated value. In other words, since the model that has learned the value of such a feature set can properly reflect the difference in combinations of the "gender" and "place of residence" of the user to be classified to the distance on the Hilbert space, it is assumed that the classification target can be properly classified.

The information providing device 10 then treats a combination of any features among various target data such as users as a new feature, and causes the model to learn the features of a predetermined target using the new feature data. In other words, the information providing device 10 generates values indicating input feature crosses from the learning data, and performs model learning using the generated values.

For example, when the learning data indicating the feature "gender" of the user in two classes and the learning data indicating the feature "place of residence" of the user in two classes are present, the information providing device 10 generates four classes of learning data including sets of "gender" and "place of residence" as features. That is, the information providing device 10 generates learning data indicating a combination of a plurality of feature values (learning data indicating product of features). The information providing device 10 then performs model learning using the generated learning data.

As a result of such processes, the information providing device 10 can classify the classification target according to a combination of features. Consequently, it is possible to achieve model learning that allows the classification target to be properly classified even if the actual classification result is highly related to the combination of features.

[1-4. Example of Process Performed by Information Providing Device 10]

Hereinafter, an example of the learning process and the evaluation process performed by the information providing device 10 will be described. In the following description, it is assumed that the information providing device 10 performs the following learning process and evaluation process on a model generated by the index generation process and the model generation process described above.

First, the information providing device 10 receives the provision of a constraint condition from the user U (step S1). Here, the constraint condition is information indicating what type of set of features (hereinafter, collectively referred to as "feature set") is used for learning data. The information providing device 10 generates a feature set based on such a constraint condition (step S2).

For example, the information providing device 10 receives the specification of candidates for a feature to be included in a feature set, the number of features to be included in a feature set or the range of the number, the number of feature sets to be generated, and the type of a feature set value as the constraint condition. In such a case, the information providing device 10 generates a feature set according to the constraint condition. If such a constraint condition is not specified, the information providing device 10 may randomly generate a feature set.

For example, when "feature #1", "feature #2", and "feature #3" are specified as the candidates for features to be included in a feature set, the information providing device 10 generates a feature set that is a combination of these candidates. For example, the information providing device 10 generates a feature set in which "feature #1" and "feature #2" are combined, a feature set in which "feature #1" and "feature #3" are combined, and a feature set in which "feature #2" and "feature #3" are combined, and a feature set in which "feature #1", "feature #2", and "feature #3" are combined.

Further, when "feature #1" or "feature #2" is specified as the feature to be included in the feature set, the information providing device 10 generates a feature set including at least "feature #1" or "feature #2". When both "feature #1" and "feature #2" are specified as candidates, the information providing device 10 may generate a feature set including both "feature #1" and "feature #2". To give a more specific example, when the information providing device 10 generates a feature set including "feature #1", the information providing device 10 randomly selects a feature other than "feature #1", and generates a feature set including the selected feature and "feature #1".

Further, for example, when "2" is specified as the number of features to be included in the feature set, the information providing device 10 generates a feature set in which two features are combined. In addition, when "2 to 3" is specified as the range of the number of features to be included in the feature set, the information providing device 10 generates a feature set in which two features are combined and a feature set in which three features are combined. Here, the information providing device 10 may generate the same number of the feature sets in which two features are combined and the feature sets in which three features are combined, or may generate different numbers of these feature sets.

Alternatively, for example, the information providing device 10 generates a specified number of feature sets. For example, when "3" is set as the number of features to be included in the feature set and "100" is specified as the number of feature sets, the information providing device 10 generates "100" feature sets in which three features are randomly combined. When the total number of combinations of the three features is less than "100", the information providing device 10 may determine all these feature sets as generation targets.

The information providing device 10 then treats the generated feature set as one feature, and generates a value corresponding to the feature set from the learning data (step S3). More specifically, the information providing device 10 generates a value of the type specified in the constraint condition as a value corresponding to the feature set. For example, when "integer value" is set as the type of the value of the feature set, the information providing device 10 sets an integer value for classifying the classification target into four classes as a value corresponding to a feature set in which the first feature for classifying the classification target into two classes and the second feature for classifying the classification target into two classes are combined.

The generation of the value corresponding to the feature set will be described with a more specific example. For example, it is assumed that the learning data includes data indicating the feature "gender" and data indicating the feature "place of residence". Further, it is assumed that the data indicating the feature "gender" is data indicating the gender of users to be classified, and is composed of, for example, a value "0" indicating a male or a value "1" indicating a female. Further, it is assumed that the data indicating the feature "place of residence" is composed of, for example, a value "0" indicating living in Tokyo or a value "1" indicating living in a place other than Tokyo. In such a case, the information providing device 10 generates, for each classification target, a value "0" indicating "male living in Tokyo" and a value "1" indicating "male living in place other than Tokyo", a value "2" indicating "female living in Tokyo", and a value "3" indicating "female living in place other than Tokyo", as the value of the feature set in which the feature "gender" and the feature "place of residence" are combined. As a result of such a process, the information providing device 10 can generate a value indicating a combination of features for each classification target.

Figure 2:
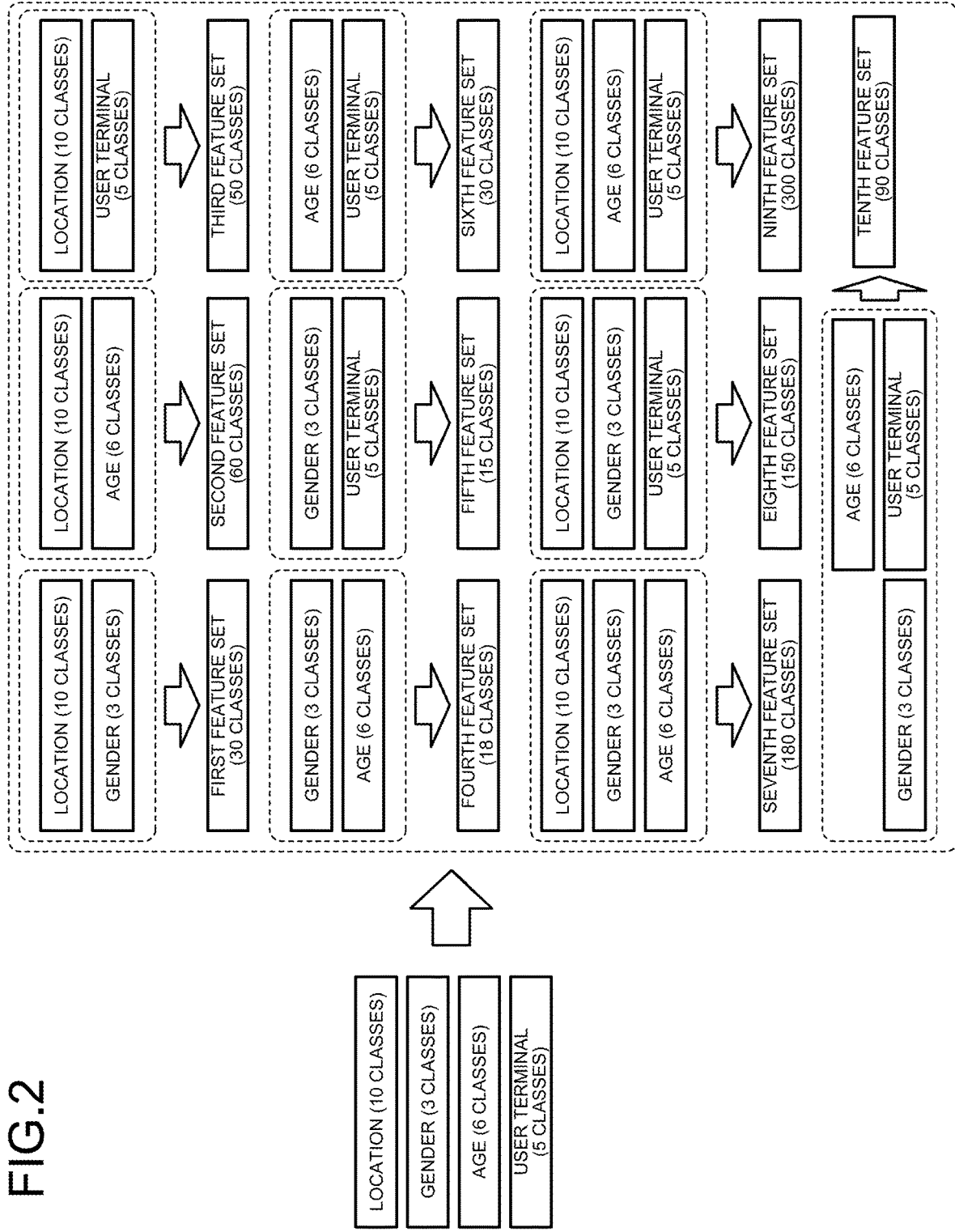
FIG. 2 is a diagram illustrating an example of the value of a feature set generated by the information providing device according to the embodiment.

Hereinafter, a feature set and a value corresponding to the feature set generated by the information providing device 10 will be described with reference to FIG. 2. FIG. 2 is a diagram illustrating an example of the value of a feature set generated by the information providing device according to the embodiment. For example, it is assumed in the example illustrated in FIG. 2 that ten classes of data indicating a feature of users to be classified "location", three classes of data indicating a feature "gender", six classes of data indicating a feature "age", and five classes of data indicating a feature "user terminal" are present as learning data. Further, it is assumed in the example illustrated in FIG. 2 that a feature set is generated by combining two or three features.

In such a case, as illustrated in FIG. 2, the information providing device 10 generates a first feature set in which the feature "location" and the feature "gender" are combined, a second feature set in which the feature "location" and the feature "age" are combined, a third feature set in which the feature "location" and the feature "user terminal" are combined, a fourth feature set in which the feature "gender" and the feature "age" are combined, a fifth feature set in which the feature "gender" and the feature "user terminal" are combined, a sixth feature set in which the feature "age" and the feature "user terminal" are combined, a seventh feature set in which the features "location", "gender", and "age" are combined, an eighth feature set in which the features "location", "gender", and "user terminal" are combined, a ninth feature set in which the features "location", "age", and "user terminal" are combined, and a tenth feature set in which the features "age", "gender", and "user terminal" are combined.

Here, the feature "location" included in the first feature set is data that classifies users into ten classes (that is, data that has ten value types), whereas the feature "gender" is data that classifies the users into three classes. The information providing device 10 thus generates values that classify the users into 30 classes that are combinations of the feature "location" and the feature "gender" as the value corresponding to the first feature set. For example, the information providing device 10 generates a value indicating a combination of a value indicating the feature "location" of a certain user and a value indicating the feature "gender" of the user as a value of the user corresponding to the first feature set.

Similarly, the information providing device 10 generates values that classify the users into 60 classes as the value of the second feature set, values that classify the users into 50 classes as the value of the third feature set, and values that classify the users into 18 classes as the value of the fourth feature set. In addition, the information providing device 10 generates values that classify the users into 15 classes as the value of the fifth feature set, values that classify the users into 30 classes as the value of the sixth feature set, and values that classify the users into 180 classes as the value of the seventh feature set. In addition, the information providing device 10 generates values that classify the users into 150 classes as the value of the eighth feature set, values that classify the users into 300 classes as the value of the ninth feature set, and values that classify the users into 90 classes as the value of the tenth feature set.

The information providing device 10 performs the process described above for each classification target to newly generate a value of each feature set. As a result of such a process, the information providing device 10 can generate a value that indicates the feature of the classification target and also indicates the feature of a combination of features from an existing feature value.

Returning to FIG. 1, the description is continued. The information providing device 10 provides the generated values of each feature set as learning data to the model generation server 2 (step S4). For example, the information providing device 10 classifies all the learning data into evaluation data and learning data, and provides the values of each feature set generated for the learning data to the model generation server 2. In such a case, the model generation server 2 generates a plurality of models using the values of each feature set (step S5). More specifically, the model generation server 2 adds nodes for inputting the values of each feature set to the generated model and performs relearning using the values of each feature set, thus generating the models.

An example of the model generated by the model generation server 2 will be described below. For example, when N feature sets are generated, the model generation server 2 generates N models in which the values of each feature set are not used individually. In addition, the model generation server 2 generates a model that has performed learning using all the feature sets as a reference model.

To give a more specific example, when N feature sets from the first feature set to the Nth feature set are generated, the model generation server 2 generates a model that has performed learning using all the feature sets from the first feature set to the Nth feature set as the reference model. In addition, the model generation server 2 generates an nth model (where, $1 \leq n \leq N$) that has performed learning using feature sets other than the nth feature set, such as a first model learned using the second feature set to the Nth feature set, a second model learned using the first feature set and the third feature set to the Nth feature set, and a third model learned using the first feature set, the second feature set, and the fourth feature set to the Nth feature set.

Such a model generation process is performed under the control of the information providing device 10. Then, the model generation server 2 provides the generated model to the information providing device 10 (step S6).

Next, the information providing device 10 evaluates each feature set based on the amount of improvement in the accuracy of the model when each feature set is used (step S7). That is, the information providing device 10 acquires the amount of improvement in accuracy when the model is caused to learn the features of values corresponding to feature sets generated from a plurality of values corresponding to a plurality of types of features, and corresponding to different feature sets, and evaluates the feature set based on the amount of improvement. For example, the information providing device 10 calculates the accuracy of each model using the evaluation data. The information providing device 10 calculates a higher evaluation value as the amount of improvement in accuracy increases.

Hereinafter, an example of a process in which the information providing device 10 evaluates each feature set will be described. For example, when the information providing device 10 evaluates the first feature set, the information providing device 10 calculates an average loss value of the first model learned without using the first feature set in the learning data and an average loss value of the reference model using the evaluation data. The information providing device 10 then calculates a value obtained by subtracting the average loss value of the reference model from the average loss value of the first model as the amount of improvement corresponding to the first feature set, and calculates a value obtained by multiplying the calculated value of amount of improvement by a predetermined coefficient (for example, "1000") as an evaluation value. That is, the information providing device 10 calculates, as the evaluation value, a value indicating the importance (Importance) of the accuracy of the first feature set, based on the amount of improvement when the values of the first feature set are used.

The information providing device 10 then repeats a process of generating a new feature set based on the evaluation value of each feature set, and performing model learning using the values of the generated feature set (step S8). For example, when the information providing device 10 calculates the evaluation values of 120 feature sets, the information providing device 10 selects 20 feature sets in order from the one with the highest evaluation value. The information providing device 10 then newly generates 80 feature sets different from the selected 20 feature sets, and performs again the processes of steps S3 to S7 on 100 feature sets in total, including the selected 20 feature sets and 80 new feature sets.

As a result of such a process, the information providing device 10 can obtain the evaluation values of 100 feature sets. In such a case, the information providing device 10 selects 20 feature sets in order from the one with the highest evaluation value among 100 feature sets, and generates 60 new feature sets. The information providing device 10 then performs again the processes of steps S3 to S7 on 80 feature sets in total, including the selected 20 feature sets and 60 new feature sets. That is, the information providing device 10 continuously evaluates the feature sets while leaving the feature sets whose evaluation satisfies a predetermined condition and at the same time, gradually reducing the number of the feature sets to be evaluated.

When the information providing device 10 evaluates the feature set a predetermined number of times, the information providing device 10 selects a predetermined number of (for example, ten) feature sets in order from the one having the highest evaluation value, and generates the final model using the selected feature sets. That is, the information providing device 10 performs model learning using the feature sets having a high evaluation value, and removes the feature sets having a low evaluation value from the learning target. The information providing device 10 then provides the generated model to the user U (step S9).

As described above, the information providing device 10 not only uses a plurality of features as they are, but also treats a feature set in which the features are combined one feature and performs model learning using the values corresponding to the feature set. As a result of such a process, the information providing device 10 can cause the model to learn the features of the feature set. Consequently, it is possible to generate a model that can classify the classification target more accurately when the feature set greatly contributes to the accuracy of classification. For example, as will be described later, it is found from the experimental results that the accuracy of the model learned using the values corresponding to the feature set significantly improves as compared with the model learned without using the values corresponding to the feature set. Consequently, the information providing device 10 can provide a model with further improved accuracy to a user. In other words, the information providing device 10 can avoid saturation in the accuracy of the model even when the size of the model is increased or the learning data is augmented.

Here, when the feature set is evaluated by the method described above, it is found from the experimental results that a feature set with a negative evaluation value is present. When the model is learned using such a feature set, the accuracy of the model decreases. Consequently, the information providing device 10 does not use all the generated feature sets, but performs model learning by using feature sets with an evaluation value exceeding a predetermined threshold value. As a result of such a process, the information providing device 10 can improve the accuracy of the model while suppressing the increase in the size of the model.

[1-5. Variations of Learning Process and Evaluation Process]

An example in which the information providing device 10 performs model learning using the values of a feature set and evaluates the feature set based on the accuracy of the model has been described above. However, the embodiment is not limited thereto. Hereinafter, variations of the learning process and the evaluation process performed by the information providing device 10 will be described.

[1-5-1. Evaluation Value]

In the example described above, the value of the importance of the feature set is calculated as the evaluation value of each feature set. However, the embodiment is not limited thereto. For example, the information providing device 10 may calculate an evaluation value based on the amount of improvement in the accuracy of the model when the feature set is used.

For example, the information providing device 10 generates a model in which the existing model is relearned by using each feature set individually. To give a more specific example, the information providing device 10 acquires an existing model that has been relearned by additionally using only the first feature set as the first model. Then, the information providing device 10 may calculate the amount of improvement when the first feature set is used based on the difference between the accuracy of the first model and the accuracy of the existing model, and calculate the evaluation value based on the calculated amount of improvement. For example, the information providing device 10 may calculate the evaluation value of the first feature set based on the value obtained by subtracting the average loss value of the existing model from the average loss of the first model.

Further, the information providing device 10 may directly use the difference between the average loss values as the evaluation value. Alternatively, the information providing device 10 may calculate the evaluation value of the first feature set based on the difference between the correct answer rate of the model using the first feature set and the correct answer rate of the existing model, or the difference between the correct answer rate of a model using another feature set without using the first feature set and the correct answer rate of the reference model. In addition, the information providing device 10 may calculate the evaluation value based on the true positive rate, false negative rate, false positive rate, and/or true negative rate of each model. Alternatively, the information providing device 10 may calculate the evaluation value of the first feature set by using both the difference between the average loss of the model using the first feature set and the average loss of the existing model and the difference between the average loss of the model using another feature set without using the first feature set and the average loss of the reference model.

Further, the information providing device 10 may calculate the evaluation value based on the value of AUC (Area under a Receiver Operating Characteristic Curve) of each model. The information providing device 10 may calculate, in addition to these index values, any index value that can evaluate the accuracy of each model with respect to the model using the feature set to be evaluated and the model not using the feature set, and evaluate the feature set based on the calculated index value. The information providing device 10 may also evaluate the feature set based on a combination of various values, or may also evaluate the feature set from values obtained by inputting these values into a predetermined function. That is, the information providing device 10 may evaluate each feature set by using any method as long as the information providing device 10 evaluates each feature set based on the amount of improvement in the accuracy of a model corresponding to each feature set.

[1-5-2. Feature Set]

In the example described above, the information providing device 10 generates a value of a feature set from a combination of the values indicating features included in the feature set. The information providing device 10 may generate a value of any type as the value of the feature set. For example, the information providing device 10 may generate an integer value or a floating point value, for example. Alternatively, the information providing device 10 may use a value obtained by simply combining the values of the features included in the feature set as the value of the feature set. The type of the value of the feature set may be specified by a constraint condition.

The information providing device 10 may generate the value of the feature set by any method as long as the value indicating a combination of the values of features included in the feature set is treated as the value of the feature set. For example, it is assumed that the first feature is a photograph of a user's face and the value of the first feature is the image data of the photograph of the face. For example, it is assumed that the second feature is a user's voice and the value of the first feature is the voice data of the voice. In such a case, the information providing device 10 may adopt a hash value or the like in which the image data and the voice data are input as the value of the feature set including the first feature and the second feature.

Further, the information providing device 10 vectorizes the value of the first feature based on the similarity of the information of the first feature, and vectorizes the value of the second feature based on the similarity of the information of the second feature. The information providing device 10 may use a vector based on each vector as the value of the feature set, such as the sum or combination of the vector corresponding to the value of the first feature and the vector corresponding to the value of the second feature. The information providing device 10 may also generate a vector that is the value of the feature set from a combination of the face image and the voice data by using a model that has learned the similarity of the combination of the face image and the voice data.

For example, when both the first feature and the second feature are images, the information providing device 10 may use a single image obtained by composing these images as a value corresponding to the feature set, and when all the features are voice data, the information providing device 10 may use single voice data obtained by composing these pieces of voice data as a feature set. That is, the "value" of the feature set is not limited to a simple numerical value, but is a concept including numerical values constituting various data.

[1-5-3. Feature Set Used for Learning]

In the example described above, the information providing device 10 performs model learning using a feature set having a higher evaluation value than other feature sets. However, the embodiment is not limited thereto. For example, the information providing device 10 may perform model learning by using all the feature sets with a positive evaluation value, or by using all the feature sets with an evaluation value exceeding a predetermined threshold value. Alternatively, the information providing device 10 may perform model learning by using a predetermined number of feature sets in order from the one with the highest evaluation value among the feature sets with a positive evaluation value. When there is no feature set with a positive evaluation value, the information providing device 10 may generate again a predetermined number of feature sets at random or according to a constraint condition.

The information providing device 10 may generate a new feature set based on the feature set whose evaluation value satisfies a predetermined condition. For example, the information providing device 10 selects a predetermined number of feature sets in order from the one with the highest evaluation value among the feature sets. The information providing device 10 then specifies the feature included in the selected feature sets. The information providing device 10 may generate a new feature set including the specified feature and evaluate each generated feature set. The information providing device 10 may also newly generate a feature set that does not include a feature that is included in the feature set with a low evaluation value.

The information providing device 10 counts the number of individual features included in selected feature sets, and selects a predetermined number of features in order from the one with the largest number of counts. The information providing device 10 then may generate a new feature set including the selected feature. Further, the information providing device 10 selects a predetermined number of feature sets in order from the one with the lowest evaluation value among the feature sets, and counts the number of individual features included in the selected feature sets. The information providing device 10 then may specify a predetermined number of features in order from the one with the largest number of counts, and newly generate a feature set that does not include the specified feature.

That is, the information providing device 10 may treat a feature included in each feature set as a gene in a genetic algorithm, and newly generate a feature set in view of various crossovers, thus generating a feature set that efficiently improves the accuracy of a model. In addition, at the time of generating such a feature set, the information providing device 10 may use the genetic algorithm such as mutation or various crossovers in any manner.

[1-5-4. Model]

Here, a specific example of a model generated by the model generation server 2 from a request of the information providing device 10 will be described. For example, when N feature sets are generated, the information providing device 10 generates a model in which nodes for inputting values corresponding to the N feature sets are added to an existing model. Subsequently, the information providing device 10 causes the model to learn in a state where the values of all the feature sets are input to the model to generate a reference model and a model when the values of each feature set are not input, respectively.

In a case of generating the model when the values of each feature set are not input, the information providing device 10 may generate a model by not inputting the values of each feature set to the model itself. However, the information providing device 10 performs the following process in order to improve the efficiency of a model generation process. First, the information providing device 10 generates, as a model, a model that includes an embedding layer that embeds the values of each feature set closer to an input layer than an intermediate layer. The information providing device 10 then inputs the values of all the feature sets from the input layer and sets the weight factor of the path that transmits information to a node embedding the value of any of the feature sets among the nodes included in the embedding layer to "0", thus generating the model that does not use the values of each feature set. With such a process, the information providing device 10 can efficiently generate a model that does not use each feature set.

The information providing device 10 may generate a so-called wide deep model in which a linear model and a deep model are combined. When generating such a wide deep model, the information providing device 10 may receive the specification of the mode of using a feature set as a constraint condition. For example, the information providing device 10 may receive the specification as to whether learning is performed by inputting the values of a feature set to a linear model portion or by inputting the values of the feature set to a deep model portion. The information providing device 10 may also receive, as a constraint condition, the specification that the values of the feature set are input to both the linear model portion and the deep model portion to perform learning.

Further, when such a specification is not made, the information providing device 10 may randomly select a portion to which the values of the feature set are input. The information providing device 10 may also calculate an evaluation value in the case where the values of the feature set are input to the linear model portion and in the case where the values of the feature set are input to the deep model portion, and perform a process based on the calculation results. That is, the information providing device 10 may perform an evaluation for each combination of a feature set and the portion to which the values of the feature set are input (hereinafter, referred to as "feature input set"), and may specify a feature input set used for learning or generate a new feature input set according to the results of such an evaluation.

[1-5-6. Evaluation Process]

In the example described above, the information providing device 10 selects a feature set to be learned and generates a new feature set based on the results of evaluation of feature sets, and selects again a new feature set based on the results of evaluation of the selected feature set and the new feature set. By repeatedly performing such a process, the information providing device 10 selects a feature set that contributes to the improvement of accuracy. However, the embodiment is not limited thereto.

For example, the information providing device 10 may generate and provide a model by simply using the feature set selected based on the first results of evaluation as a learning target. Further, the information providing device 10 may only present the content of evaluation of each feature set to the user. That is, the information providing device 10 may operate as an evaluation device instead of a learning device, or may operate as both a learning device and an evaluation device.

For example, the information providing device 10 calculates the evaluation value of each feature set, and generates a list showing the features included in each feature set in order from the one with the highest calculated value. The information providing device 10 may provide the generated list to a user. Alternatively, for example, the information providing device 10 may generate a list showing a predetermined number of feature sets in order from the one with the highest evaluation value and a predetermined number of evaluation values in order from the lowest evaluation value, and provides the list to the user. The information providing device 10 may also generate a list showing a feature set with a positive evaluation value as a feature set that improves the accuracy, and a feature set with a negative evaluation value as a feature set that reduces the accuracy (or showing one of these feature sets).

When these lists are provided, the user can consider or estimate what combination of features is effective for a purpose or what combination of features is not effective for a purpose. As a result of such an estimation, the user can create, for example, a new constraint condition (that is, new constraint condition created according to results of evaluation), and newly obtain results of performing model learning and the evaluation of feature sets using the feature sets satisfying the created constraint condition. By repeatedly performing such an interactive process, the information providing device 10 can promote understanding of a model according to a purpose and improve the accuracy of the model.

[1-5-7. Applicable Target]

In the example described above, the information providing device 10 generates a model for classifying users based on various information about the users to be classified. The learning process and evaluation process described above may be performed on any learning data in the embodiment.

For example, the information providing device 10 may generate a model that predicts a CTR based on user information, and optimize a feature set using the generated model. The information providing device 10 may also generate a model that predicts a transaction target to be purchased by a user based on user information, and optimize a feature set using the generated model.

Further, the information providing device 10 may optimize a feature set in order to improve the accuracy of any model such as classification, prediction, and translation processing, based on not user information but, for example, log data of various information processing devices, sentences, weather, and any other types of data.

4. CONFIGURATION OF INFORMATION PROVIDING DEVICE

Figure 3:
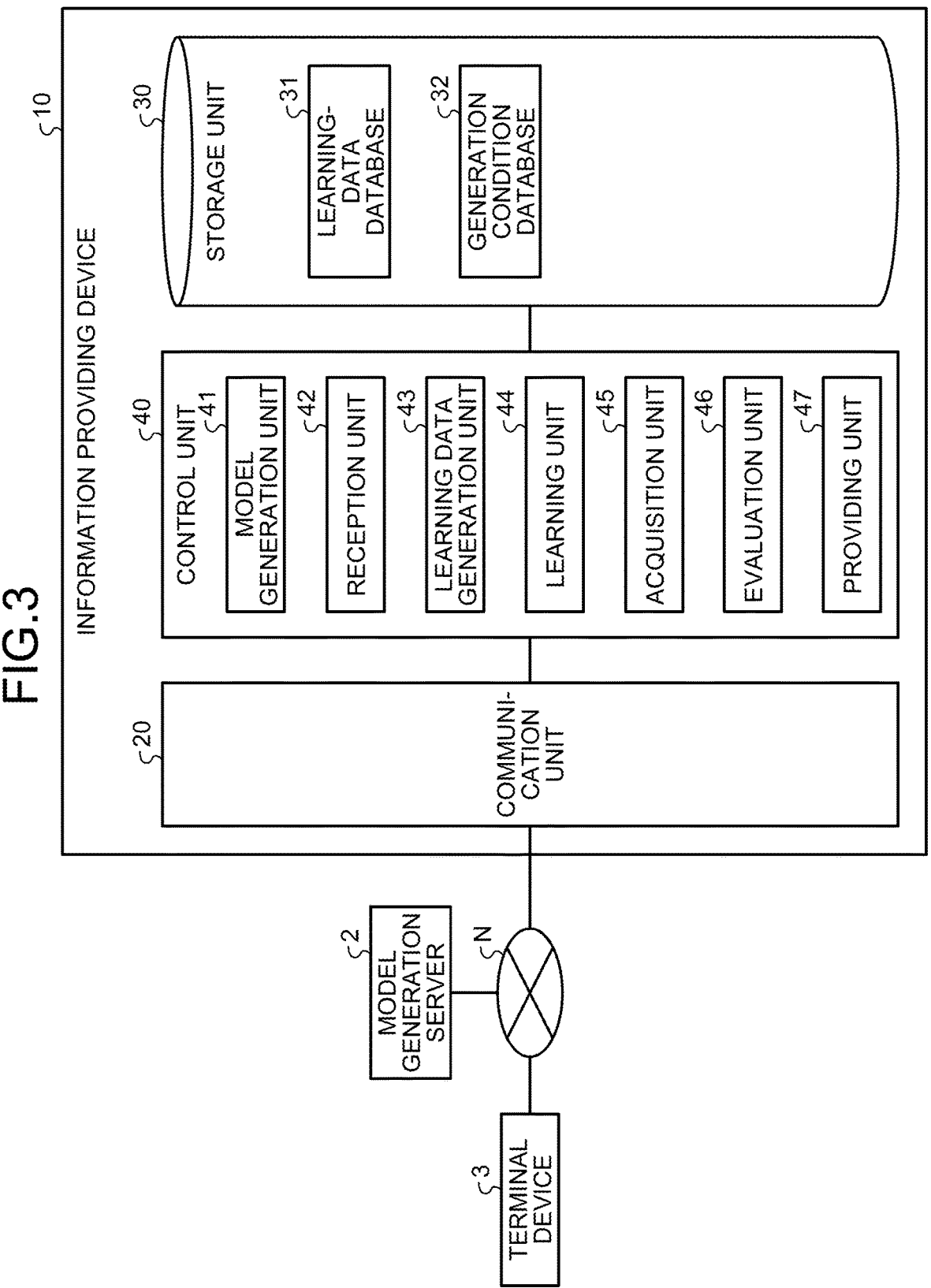
FIG. 3 is a diagram illustrating a configuration example of the information providing device according to the embodiment.

Next, an example of a functional configuration of the information providing device 10 according to the embodiment will be described with reference to FIG. 3. FIG. 3 is a diagram illustrating a configuration example of the information providing device according to the embodiment. As illustrated in FIG. 3, the information providing device 10 includes a communication unit 20, a storage unit 30, and a control unit 40.

The communication unit 20 is implemented by, for example, an NIC (Network Interface Card) or the like. The communication unit 20 is connected to a network N by wire or wirelessly, and transmits or receives information to or from the model generation server 2 and the terminal device 3.

The storage unit 30 is implemented by, for example, a semiconductor memory element such as a RAM (Random Access Memory) or a flash memory (Flash Memory), or a storage device such as a hard disk or an optical disk. Further, the storage unit 30 includes a learning-data database 31 and a generation condition database 32.

Learning data is registered in the learning-data database 31. For example, FIG. 4 is a table illustrating an example of information registered in a learning-data database according to the embodiment. In the example illustrated in FIG. 4, a learning data ID (Identifier) and learning data are associated with each other and registered in the learning-data database 31. Here, the learning data ID is an identifier that identifies a plurality of data groups that serve as learning data. The learning data is data used for learning.

For example, in the example illustrated in FIG. 4, a set of "label #1-1" and "data #1-1" and a set of "label #1-2" and "data #1-2" are associated with "learning data #1" and registered in the learning-data database 31. Such information indicates that a piece of "data #1-1" with "label #1-1" and a piece of "data #1-2" with "label #1-2" are registered as the learning data by "learning data #1". A plurality of pieces of data indicating an identical feature may be registered in each label. Conceptual values such as "learning data #1", "label #1-1", and "data #1-1" are described in the example illustrated in FIG. 4. However, in practice, character strings and numerical values for identifying the learning data, character strings as labels, various integers, floating point numbers, or character strings as data are registered.

Returning to FIG. 3, generation conditions in which various conditions related to the learning data are associated with various indexes determined as generation indexes or candidates for the generation indexes when the learning data satisfies the conditions are registered in the generation condition database 38. For example, FIG. 5 is a table illustrating an example of information registered in a generation condition database according to the embodiment. In the example illustrated in FIG. 5, a condition ID, a content of conditions, and an index candidate are registered associated with each other and registered in the generation condition database 32.

Here, the condition ID is an identifier that identifies the generation condition. Further, the content of conditions is a condition to be determined whether or not the learning data satisfies, and is composed of, for example, various conditions such as a content condition that is a condition related to the content of the learning data and a tendency condition related to the tendency of the learning data. The index candidate indicates various indexes that are included in a generation index when each condition included in the associated content of conditions is satisfied.

For example, the condition ID "condition ID #1", the content condition "integer", the tendency condition "density<threshold value", and the index candidate "generation index #1" are associated with each other and registered in the generation condition database 38. Such information indicates that when the learning data satisfies the content condition "integer" and the tendency condition "density<threshold value" as the condition ID "condition ID #1", the index candidate "generation index #1" is determined as the generation index.

Conceptual values such as "generation index #1" are described in the example illustrated in FIG. 5. However, in practice, information adopted as various generation indexes is registered. For example, various functions described in a config file in AutoML are registered as index candidates in the generation condition database 38. For example, a plurality of generation indexes for one condition may also be registered in the generation condition database 38.

As described above, it is possible to freely set which generation index is generated for which condition. For example, it suffices that various generation indexes for models that have been generated in the past and have an accuracy exceeding a predetermined threshold value, and the generation conditions generated based on the features and tendencies of the learning data used for learning the model are registered in the generation condition database 38.

Returning to FIG. 3, the description is continued. The control unit 40 is implemented by, for example, a CPU (Central Processing Unit), an MPU (Micro Processing Unit), or the like executing various programs stored in a storage device within the information providing device 10 using a RAM as a work area. Further, the control unit 40 is implemented by, for example, an integrated circuit such as an ASIC (Application Specific Integrated Circuit) or an FPGA (Field Programmable Gate Array). As illustrated in FIG. 3, the control unit 40 includes a model generation unit 41, a reception unit 42, a learning data generation unit 43, a learning unit 44, an acquisition unit 45, an evaluation unit 46, and a providing unit 47.

[4-1. Configuration for Achieving Index Generation Process and Model Generation Process]

The model generation unit 41 performs an index generation process and a model generation process prior to the explanation of a learning process and an evaluation process. For example, when the model generation unit 41 receives various data to be used as learning data and labels attached to the various data from the terminal device 3, the model generation unit 41 registers the received data and labels in the learning-data database 31 as learning data. The model generation unit 41 may receive the indication of the learning data ID and label of learning data used for model learning among the data registered in the learning-data database 31 in advance.

In addition, the model generation unit 41 generates a generation index based on the features of the learning data, such as the statistical features of the learning data. For example, the model generation unit 41 generates a generation index according to whether or not the learning data satisfies the generation condition registered in the generation condition database 32. For example, the model generation unit 41 may generate a generation index based on whether the learning data is an integer, a floating point, or a character string. To give a more specific example, when the learning data is an integer, the model generation unit 41 may generate a generation index based on the continuity of the learning data.

For example, when the model generation unit 41 calculates the density of the learning data and the calculated density exceeds a predetermined first threshold value, the model generation unit 41 may generate a generation index based on whether or not the maximum value of the learning data exceeds a predetermined second threshold value. That is, the model generation unit 41 may generate different generation indexes depending on whether or not the maximum value exceeds the second threshold value. Further, when the density of the learning data is lower than the predetermined first threshold value, the model generation unit 41 may generate a generation index based on whether or not the number of unique values included in the learning data exceeds a predetermined third threshold value.

The model generation unit 41 may generate different generation indexes according to a conditional branch whether or not the density and maximum value of the learning data exceed various threshold values. For example, the model generation unit 41 may generate a generation index corresponding to the density and maximum value of the learning data themselves. For example, the model generation unit 41 may calculate the values of parameters functioning as various generation indexes such as the number of nodes or intermediate layers of a model based on statistical values such as the number, density, and maximum value of the learning data. That is, the model generation unit 41 may generate a generation index based on any condition as long as the model generation unit 41 generates different generation indexes based on the features of the learning data.

When the learning data is a character string, the model generation unit 41 generates a generation index based on the number of types of character strings included in the learning data. That is, the model generation unit 41 generates different generation indexes depending on the number of types of unique character strings. Further, when the learning data is a floating point, the model generation unit 41 generates an index to convert the learning data into input data to be input to a model as a model generation index. For example, the model generation unit 41 determines whether or not the floating point is bucketized, which range of values is classified into which bucket, and the like based on the statistical information of the learning data. To give a more specific example, the model generation unit 41 may determine whether or not the floating point is bucketized, which range of values is classified into which bucket, and the like based on features such as the range of values included in the learning data that is a floating point and the content of a label attached to the learning data. The model generation unit 41 may also determine whether or not the range of values corresponding to each bucket is constant and whether or not the number of pieces of learning data to be classified into each bucket is constant (or has predetermined distribution) based on the features of the learning data.

In addition, the model generation unit 41 generates, as a model generation index, a generation index indicating a feature to be learned by a model among the features of the learning data. For example, the model generation unit 41 determines the label of the data to be learned by the model based on the features of the learning data. Alternatively, the model generation unit 41 generates, as a model generation index, a generation index indicating a plurality of types of learning data for causing the model to learn correlation among the types of the learning data.

The features (labels) to be learned and the relationship between the features may be determined according to the purpose such as what type of model a user desires, for example, the label of the data output by the model. Which feature is adopted or which combination of features is learned may be determined in such a manner that, for example, in the genetic algorithm described above, a bit indicating whether or not each feature or a combination of features is adopted is treated as a gene and a generation index in the next generation is generated to discover a feature or a combination of features that further improve the accuracy of the model.

In addition, the model generation unit 41 generates, as a model generation index, a generation index indicating the number of dimensions of the learning data to be input to the model. The model generation unit 41 also generates, as a model generation index, a generation index indicating the type of a model that learns the features of the learning data. The model generation unit 41 also generates, as a model generation index, a generation index indicating the number of intermediate layers of the model or the number of nodes included in each layer. The model generation unit 41 generates, as a model generation index, a generation index indicating the connection mode between the nodes of the model. The model generation unit 41 also generates, as a model generation index, a generation index indicating the size of the model. For example, the model generation unit 41 may generate a generation index indicating the number of dimensions of the learning data to be input to the model, for example, may determine various structures of the model, according to the number of pieces of unique learning data, the number of features or combinations of the features to be adopted, the number of bits of numerical values or character strings functioning as the learning data, and the like.

The model generation unit 41 generates, as a model generation index, a generation index indicating a learning mode when the model is caused to learn the features of the learning data. For example, the model generation unit 41 may determine the content of hyperparameters based on the features of the learning data and various generation indexes described above. As described above, the model generation unit 41 generates generation indexes indicating the features of learning data to be learned by the model, the mode of the model to be generated, and the learning mode when the model is caused to learn the features of the learning data. The model generation unit 41 does not need to determine and generate all the generation indexes described above, and is required to determine and generate only an arbitrary type of generation index.

In addition, the model generation unit 41 presents the generated index to the user. For example, the model generation unit 41 transmits an AutoML config file generated as the generation index to the terminal device 3. The model generation unit 41 receives a modification of the generation index presented to the user. The model generation unit 41 receives from the user the specification of the features of learning data to be learned by the model, the mode of the model to be generated, and the learning mode when the model is caused to learn the features of the learning data. In such a case, the model generation unit 41 determines the features of learning data to be learned by the model, the mode of the model to be generated, and the learning mode when the model is caused to learn the features of the learning data in the order specified by the user. That is, the model generation unit 41 regenerates various generation indexes in the order specified by the user.

The model generation unit 41 generates a model that has learned the features of the learning data according to the generation index. For example, the model generation unit 41 divides the learning data into training data and evaluation data, and transmits the training data and the generation index to the model generation server 2. The model generation unit 41 then acquires the model generated from the training data by the model generation server 2 according to the generation index. In such a case, the model generation unit 41 calculates the accuracy of the acquired model using the evaluation data.

The model generation unit 41 generates a plurality of different generation indexes. In such a case, the model generation unit 41 generates a different model for each generation index and calculates the accuracy of each model. The model generation unit 41 may generate different training data and evaluation data for each model, or may adopt the same training data and evaluation data.

As described above, when a plurality of models are generated, the model generation unit 41 newly generates a model generation index based on the accuracy of the generated model. For example, the model generation unit 41 generates a new generation index from a plurality of generation indexes by using a genetic algorithm that treats a determination whether or not each piece of learning data is used or a determination as to which generation index is adopted as a gene. The model generation unit 41 then generates a new model based on the new generation index. By repeatedly performing such trial and error a predetermined number of times or until the accuracy of the model exceeds a predetermined threshold value, the information providing device 10 can achieve the generation of a generation index that improves the accuracy of the model.

The model generation unit 41 may also optimize the order of determining the generation index as the target of the genetic algorithm. Further, the model generation unit 41 may present a generation index to the user each time the generation index is generated. For example, the model generation unit 41 may present only the generation index corresponding to the model with an accuracy exceeding a predetermined threshold value to the user.

The model generation unit 41 then provides the generated model to the user. For example, when the accuracy of the generated model exceeds the predetermined threshold value, the model generation unit 41 transmits the model and the generation index corresponding to the model to the terminal device 3. As a result, the user can evaluate and try the model, and modify the generation index.

It is described in the example illustrated in FIG. 3 that the model generation unit 41 performs the index generation process and the model generation process, but the embodiment is not limited thereto. For example, the model generation unit 41 is implemented by a program for causing the information providing device 10 to perform the processes described above, but may operate as a single functional configuration. For example, the model generation unit 41 may be implemented by a functional configuration in which an acquisition function of acquiring learning data, an index generation function of generating a generation index, a presentation function of presenting a generation index to a user, a reception function of receiving a modification of a generation index, a model generation function of generating a model based on a generation index, and a provision function of providing a generated model are independent from each other.

[4-2. Configuration for Achieving Learning Process and Evaluation Process]

Next, the configuration for achieving a learning process and an evaluation process will be described. The reception unit 42 receives a constraint condition for generating a feature set from a predetermined operator. For example, the reception unit 42 receives, from the terminal device 3, the specification of features to be included in each feature set, the specification of the number of features to be included in each feature set or the range of numbers, the specification of the number of feature sets to be generated, and the specification of candidates for features to be included in a feature set. The reception unit 42 may receive a specification as to whether the type of values of a feature set or the range of values, and values of a feature set are input to a linear model portion or a deep model portion. In addition to these, the reception unit 42 may receive a condition about a feature set itself, a condition about values of a feature set, and a constraint condition indicating a condition as to how to use values of a feature set for learning.

The learning data generation unit 43 generates, from a plurality of values indicating the features of a predetermined target and indicating different types of a plurality of features, values corresponding to sets of the types of the features. For example, the learning data generation unit 43 may generate a set in which the features of the predetermined target are randomly combined, and generate a corresponding value for each generated set. The learning data generation unit 43 may generate, from values of a plurality of features, a value indicating the product of the features. For example, the learning data generation unit 43 generates, from a value of a first type feature and a value of a second type feature, a value corresponding to a set of the first type feature and the second type feature.

Here, the learning data generation unit 43 generates a set in which the features of a predetermined target are combined according to a constraint condition, and generates a corresponding value for each generated set. For example, the learning data generation unit 43 may generate a set including at least a feature specified by the constraint condition, and generate a corresponding value for each generated set. The learning data generation unit 43 may also generate a set including a specified number of features and generate a corresponding value for each generated set. The learning data generation unit 43 may also generate a specified number of sets and generate a corresponding value for each generated set. The learning data generation unit 43 may also generate a set in which candidates for a specified feature are combined, and generate a corresponding value for each generated set.

Hereinafter, an example of learning data generated by the learning data generation unit 43 will be described. First, the learning data generation unit 43 classifies each piece of data registered in the learning-data database 31 into learning data and evaluation data. In this process, the results of classification by the model generation unit 41 may be used. Next, the learning data generation unit 43 refers to the label of each piece of data included in the learning data. The learning data generation unit 43 generates a feature set using each label as a feature.

For example, when the labels of the data included in the learning data are "label #1-1", "label #1-2", and "label #1-3", the learning data generation unit 43 may adopt a set in which two or more of these labels are randomly combined as a feature set. Alternatively, the learning data generation unit 43 may generate a feature set according to the content specified by a constraint condition. For example, when "label #1-1" is specified, the learning data generation unit 43 may generate a feature set including at least "label #1-1".

The learning unit 44 causes the model to learn the features of a predetermined target using the values generated by the learning data generation unit 43. For example, the learning unit 44 causes the model that is generated by the model generation unit 41 and has the structure of a deep neural network to learn the features of the learning data generated by the learning data generation unit 43.

For example, the learning unit 44 generates a model in which nodes for inputting the values of each feature set are added to the input layer of the model. The learning unit 44 then transmits the generated model and the learning data generated by the learning data generation unit 43 to the model generation server 2, and causes the model to learn the features of the learning data.

For example, the learning unit 44 generates a model that has learned by data of all feature sets being inputted thereto at the same time, as a reference model. Alternatively, the learning unit 44 generates a plurality of models that have learned by the data of any one feature set not being input, but the data of the other feature sets being input thereto at the same time. The learning unit 44 may also generate a plurality of models by, for example, forcibly setting the coefficient of connection of an embedding layer corresponding to a feature set that is not input to a node to zero.

Hereinafter, an example of a process performed by the learning unit 44 will be described. For example, when the learning data generation unit 43 generates N feature sets, the learning data generation unit 43 generates N values corresponding to the feature sets for each classification target corresponding to learning data. In such a case, when the learning unit 44 inputs N feature set values generated for a certain classification target, the learning unit 44 causes a model to learn so as to properly classify the classification target, thus generating a reference model. In addition, the learning unit 44 inputs N feature set values generated for a certain classification target and forcibly sets the coefficient of connection of a node to an embedding layer corresponding to a predetermined feature set to zero, thus generating a plurality of models that does not use any of the feature sets. By repeatedly performing such a process for each classification target, the learning unit 44 causes each model to learn.

The learning unit 44 may perform model learning according to a constraint condition. For example, the learning unit 44 may perform learning so that a value corresponding to a feature set is input to a linear model portion of a wide deep model, a deep model portion of the wide deep model, or both the linear model portion and the deep model portion, according to the constraint condition.

The acquisition unit 45 acquires the amount of improvement in accuracy when the model is caused to learn the features of values corresponding to a plurality of types of feature sets generated from a plurality of values corresponding to a plurality of types of features, that is, values corresponding to different feature sets. For example, the acquisition unit 45 acquires a plurality of models generated by the learning unit 44. The acquisition unit 45 then calculates the average loss of the model that does not use any of the feature sets and the average loss of the reference model, and acquires the difference between the calculated values as the amount of improvement.

The evaluation unit 46 evaluates a feature set corresponding to the value generated by the generation unit based on the results of learning by the learning unit. For example, the evaluation unit 46 evaluates a feature set based on the amount of improvement acquired by the acquisition unit 45.

For example, the evaluation unit 46 calculates a value obtained by multiplying the difference between the values calculated by the acquisition unit 45 by a predetermined coefficient as an evaluation value. More specifically, the evaluation unit 46 calculates the evaluation value of a feature set based on the amount of improvement calculated from the average loss of the model that does not use the value corresponding to the feature set and the average loss of the reference model.

The results of evaluation by the evaluation unit 46 described above are recursively used by the learning data generation unit 43 and the learning unit 44. For example, the learning unit 44 may perform model learning by using the values of a feature set whose evaluation results satisfy a predetermined condition. To give a more specific example, the learning unit 44 may select feature sets whose evaluation results exceed a predetermined threshold, such as a feature set with a positive evaluation value and a predetermined number of feature sets in order from the one with the highest evaluation value, and perform model relearning using only the values of the selected feature sets. Alternatively, the learning unit 44 may remove feature sets whose evaluation results are lower than a predetermined threshold, such as a feature set with a negative evaluation value and a predetermined number of feature sets in order from the one with the lowest evaluation value from feature sets whose values are used for model learning, and perform model relearning. In addition, the evaluation unit 46 may evaluate a feature set again using the model that has learned again as described above. The learning unit 44 may select a feature set to be learned according to results of such reevaluation.

The learning data generation unit 43 may also generate a value corresponding to a new feature set different from the feature set whose evaluation results satisfy a predetermined condition. In such a case, the learning unit 44 performs model relearning by using the feature set whose evaluation results satisfy the predetermined condition and the new feature set. The evaluation unit 46 may evaluate each feature set based on the results of relearning. In addition, the learning data generation unit 43, the learning unit 44, and the evaluation unit 46 may repeatedly perform generation, learning, and evaluation of feature sets so that the number of feature sets to be learned gradually decreases, thus extracting a more effective feature set.

The learning data generation unit 43 may also generate a new feature set based on the feature set whose evaluation results satisfy the predetermined condition, and generate a value corresponding to the generated feature set. For example, the learning data generation unit 43 may generate a new feature set including features included in a feature set whose evaluation results exceed a predetermined threshold value. The learning data generation unit 43 may generate a new feature set that does not include features included in a feature set whose evaluation results are lower than a predetermined threshold value. By performing such a process, the learning data generation unit 43 can perform a process of extracting a more effective feature set while using a genetic algorithm.

The providing unit 47 provides the results of evaluation by the evaluation unit 46 to a user. For example, the providing unit 47 may provide the user with a list in which the respective feature sets are arranged according to the evaluation value. In addition, the providing unit 47 may provide a list of feature sets with a positive evaluation value (that is, feature sets effective for model learning) and a list of feature sets with a negative evaluation value (that is, feature sets not effective for model learning).

When it is estimated that effective feature sets are extracted, such as when the recursive process described above is performed a predetermined number of times, when the variation in the evaluation value of a feature set falls within a predetermined range, or when the variation in a feature set with an evaluation value satisfying a predetermined condition falls within a predetermined range, the learning unit 44 performs model learning using the values of these feature sets. In such a case, the providing unit 47 can provide the generated model to the user, thus providing a model that achieves a purpose with high accuracy.

5. PROCESS FLOW OF INFORMATION PROVIDING DEVICE 10

Figure 6:
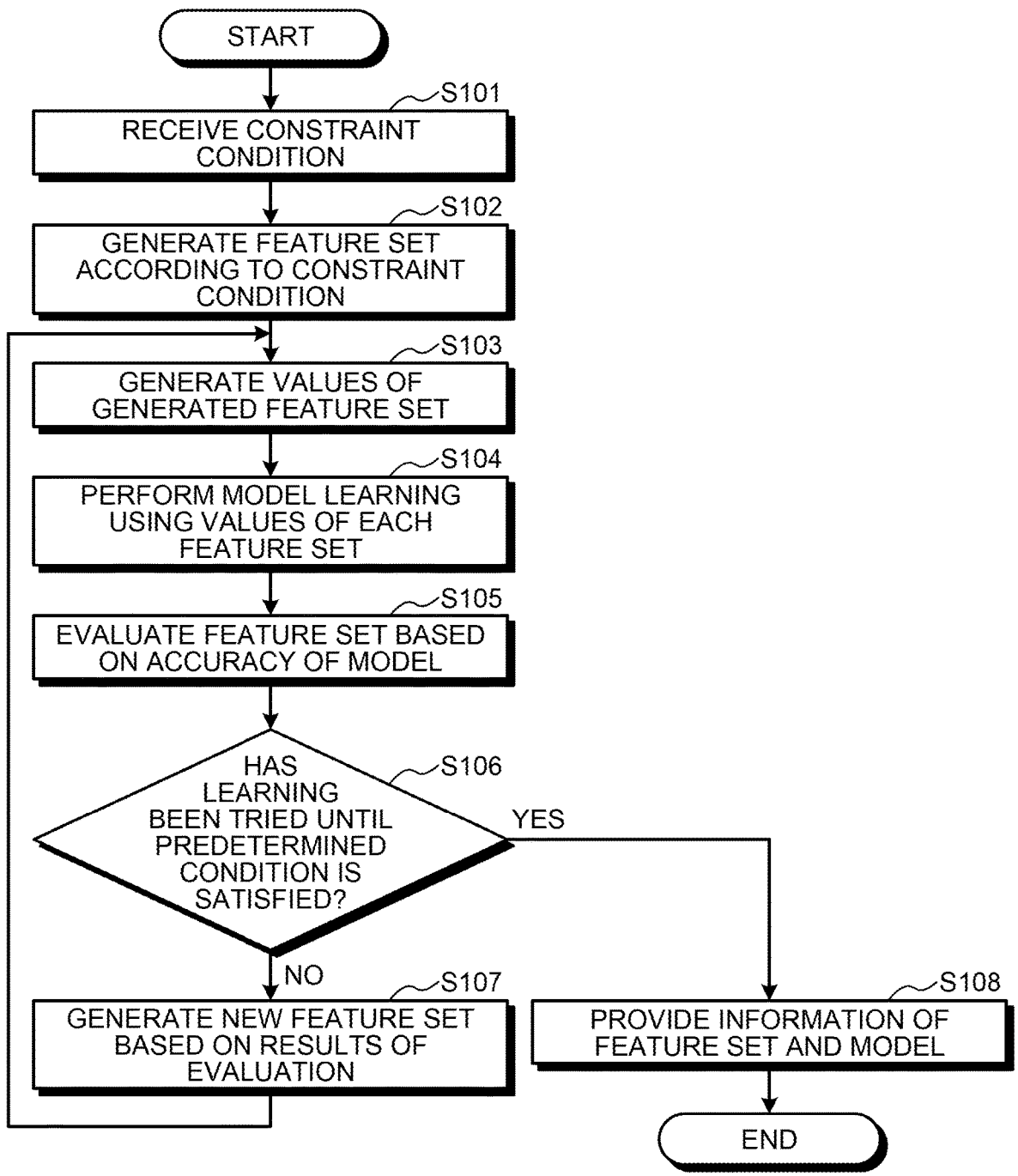
FIG. 6 is a flowchart illustrating an example of the flow of a learning process and an evaluation process according to the embodiment.

Next, the procedure of a process performed by the information providing device 10 will be described with reference to FIG. 6. FIG. 6 is a flowchart illustrating an example of the flow of a learning process and an evaluation process according to the embodiment.

For example, the information providing device 10 receives a constraint condition (step S101). In such a case, the information providing device 10 generates a feature set according to the constraint condition (step S102), and generates values of the generated feature set (step S103). The information providing device 10 then performs model learning using the values of each generated feature set (step S104).

Next, the information providing device 10 evaluates each feature set based on the accuracy of each model (step S105). Here, the information providing device 10 determines whether or not learning has been tried until a predetermined condition is satisfied (step S106). For example, the information providing device 10 determines whether or not the recursive process is performed a predetermined number of times, whether or not the variation in the evaluation value of a feature set falls within a predetermined range, whether or not the variation in a feature set with an evaluation value satisfying a predetermined condition falls within a predetermined range, whether or not the number of feature sets with an evaluation value exceeding a predetermined threshold value exceeds a predetermined threshold value, and the like.

When the information providing device 10 has not tried learning until a predetermined condition is satisfied (No in step S106), the information providing device 10 generates a new feature set based on the results of evaluation (step S107), and starts again the process from step S103. On the other hand, when the information providing device 10 has tried learning until the predetermined condition is satisfied (Yes in step S106), the information providing device 10 provides information of the feature set and the model (step S108), and ends the process.

6. EXAMPLE OF EXPERIMENTAL RESULTS

Next, an example of effects when the learning process and evaluation process described above are performed will be described with reference to FIGS. 7 to 11.

Figure 7:
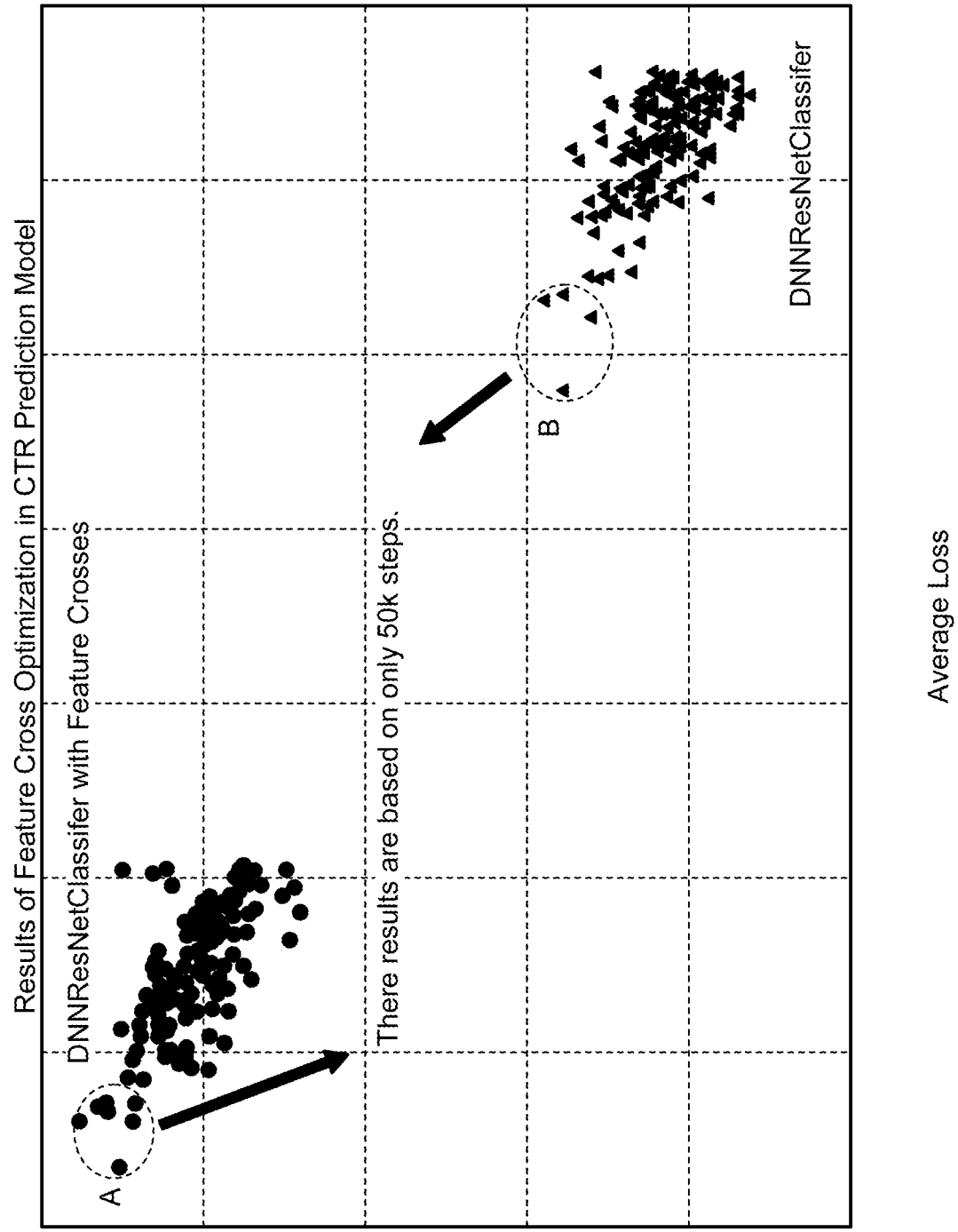
FIG. 7 is a graph illustrating an example of comparison of accuracy in the case where the feature set is used and in the case where the feature set is not used.

For example, FIG. 7 is a graph illustrating an example of comparison of accuracy in the case where the feature set is used and in the case where the feature set is not used. In the example illustrated in FIG. 7, the performance of a model learned using feature sets (DNNResNetClassfier with Feature Crosses) and the performance of a model learned without using a feature set (DNNResNetClassfier) are plotted with respect to a model that predicts CTR from user information, where the vertical axis represents a performance value (value obtained by subtracting ROC value from AUC value), and the horizontal axis represents an average loss.

As illustrated in FIG. 7, it has been found by experiments that both the average loss and the performance value are improved in the model learned using feature sets, as compared with the model learned without using feature sets. In addition, the performance of a model included in an area A surrounded by a dotted line in FIG. 7 has been significantly improved as compared with a model included in an area B, after 50,000 times of learning at most.

Figure 8:
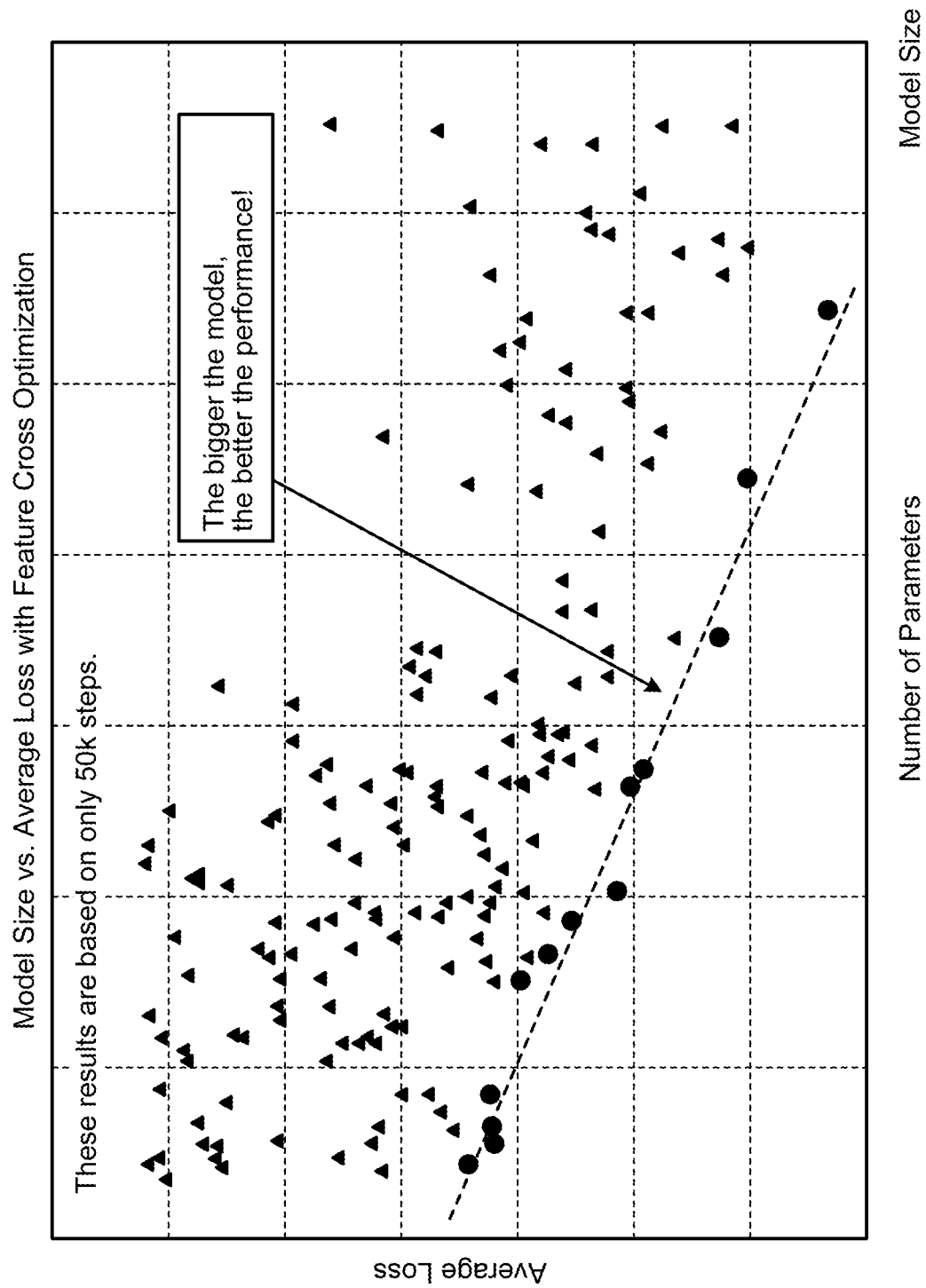
FIG. 8 is a graph illustrating the experimental results of the relationship between a model size and an average loss when the feature set is used.

Next, the experimental results of the relationship between a model size (number of types of information to be input) and an average loss when the feature set is used will be described with reference to FIG. 8. FIG. 8 is a graph illustrating the experimental results of the relationship between the model size and the average loss when the feature set is used. In the example illustrated in FIG. 8, values of the average loss of the model learned using feature sets are plotted, where the vertical axis represents an average loss value and the horizontal axis represents a model size. In the example illustrated in FIG. 8, the lowest average loss value for each model size is plotted with circles, and other values are plotted with triangles. In addition, the model illustrated in FIG. 8 has learned 50,000 times.

The dotted line in FIG. 8 is an approximate straight line of the lowest average loss value for each model size. As illustrated in FIG. 8, the approximate curve of the average loss shows that the larger the model size, the smaller the average loss value. As a result, it is found that in the model learned using feature sets, the larger the model size, the smaller the average loss value and the higher the accuracy.

Figure 9:
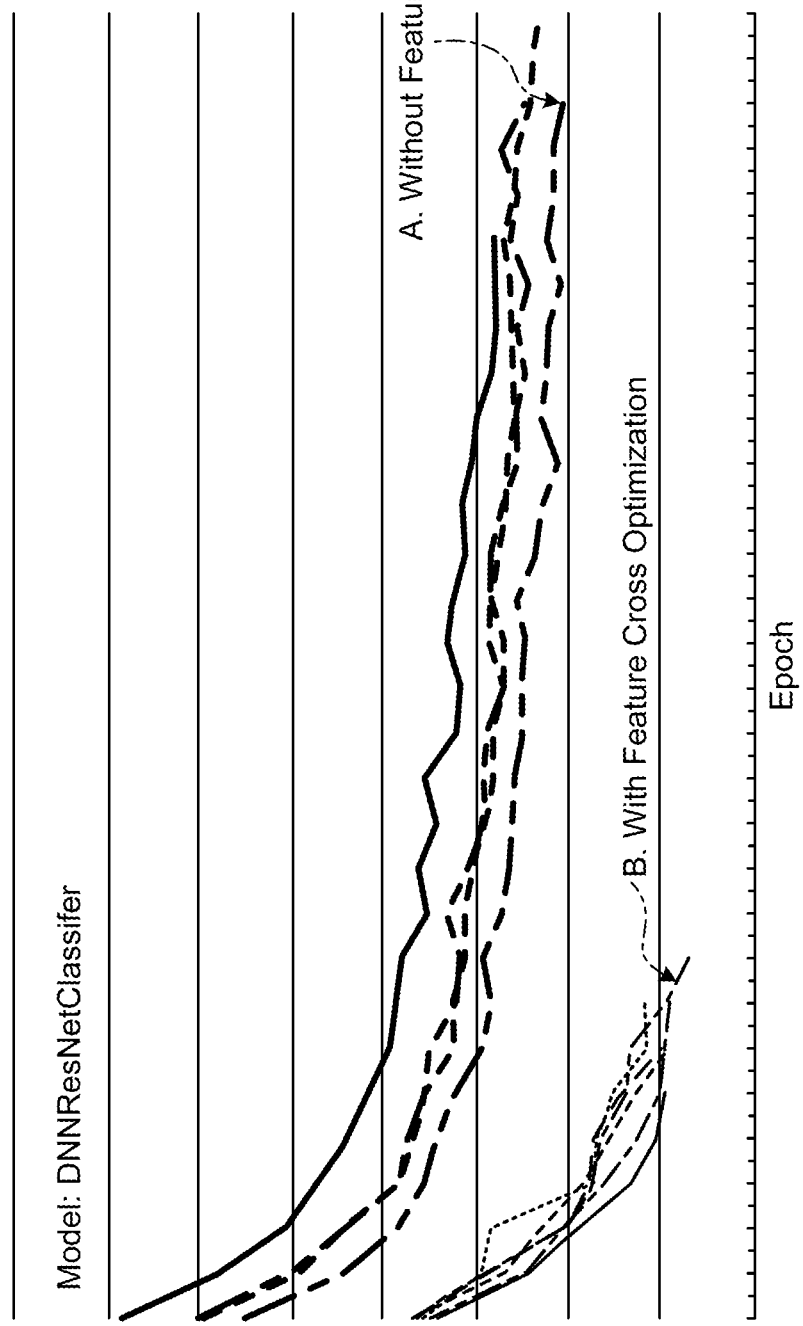
FIG. 9 is a graph illustrating an example of transition of accuracy in the case where the feature set is used and in the case where the feature set is not used.

Next, the transition of accuracy when learning continues in a model using a feature set and in a model not using a feature set will be described with reference to FIG. 9. FIG. 9 is a graph illustrating an example of transition of accuracy in the case where the feature set is used and in the case where the feature set is not used. In the example illustrated in FIG. 9, DNNResNetClassifier is used as a model. Further, in the example illustrated in FIG. 9, average loss values of four models learned without using feature sets are indicated by thick lines, and average loss values of six models learned using feature sets are indicated by thin lines, where the horizontal axis represents the number of times (epoch) that learning is performed a predetermined number of times and the vertical axis represents an average loss value.

As illustrated in FIG. 9, it is found that the accuracy of each model learned using feature sets is higher than that of the model learned without using feature sets. It is also fund that when the learning progresses, the amount of change in accuracy decreases halfway and saturation occurs in the model without using a feature set, but in the model without using a feature set, even if the learning progresses, the amount of change in accuracy does not decrease much and saturation is avoided.

Figure 10:
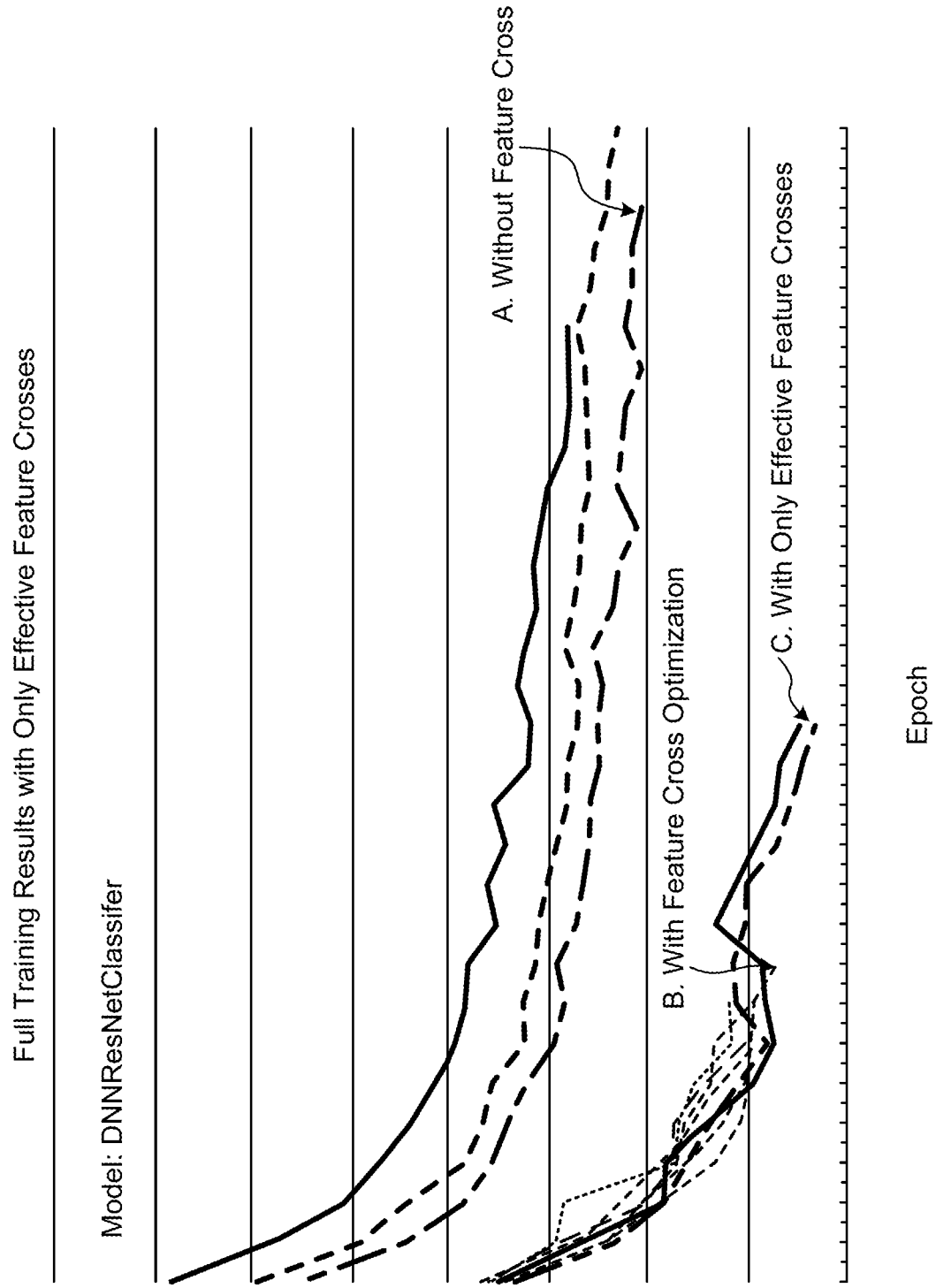
FIG. 10 is a graph illustrating an example of transition of accuracy when learning is performed using only effective feature sets.

Next, the transition of accuracy of a model learned using only effective feature sets will be described with reference to FIG. 10. FIG. 10 is a graph illustrating an example of transition of accuracy when learning is performed using only effective feature sets. In the example illustrated in FIG. 10, DNNResNetClassifier is used as a model. Further, in the example illustrated in FIG. 10, average loss values of four models learned without using feature sets are indicated by thick lines, average loss values of six models learned using feature sets are indicated by thin lines, and average loss values of two models learned using only effective feature sets are indicated by medium lines, where the horizontal axis represents the number of times (epoch) that learning is performed a predetermined number of times and the vertical axis represents an average loss value.

In these two models learned using only effective feature sets, as the learning progresses, a more effective feature set is extracted and the features of the feature set is learned. Consequently, as illustrated in FIG. 10, it is found that the accuracy of the two models learned using effective feature sets becomes even higher than the model learned simply using feature sets, as the learning progresses.

Figure 11:
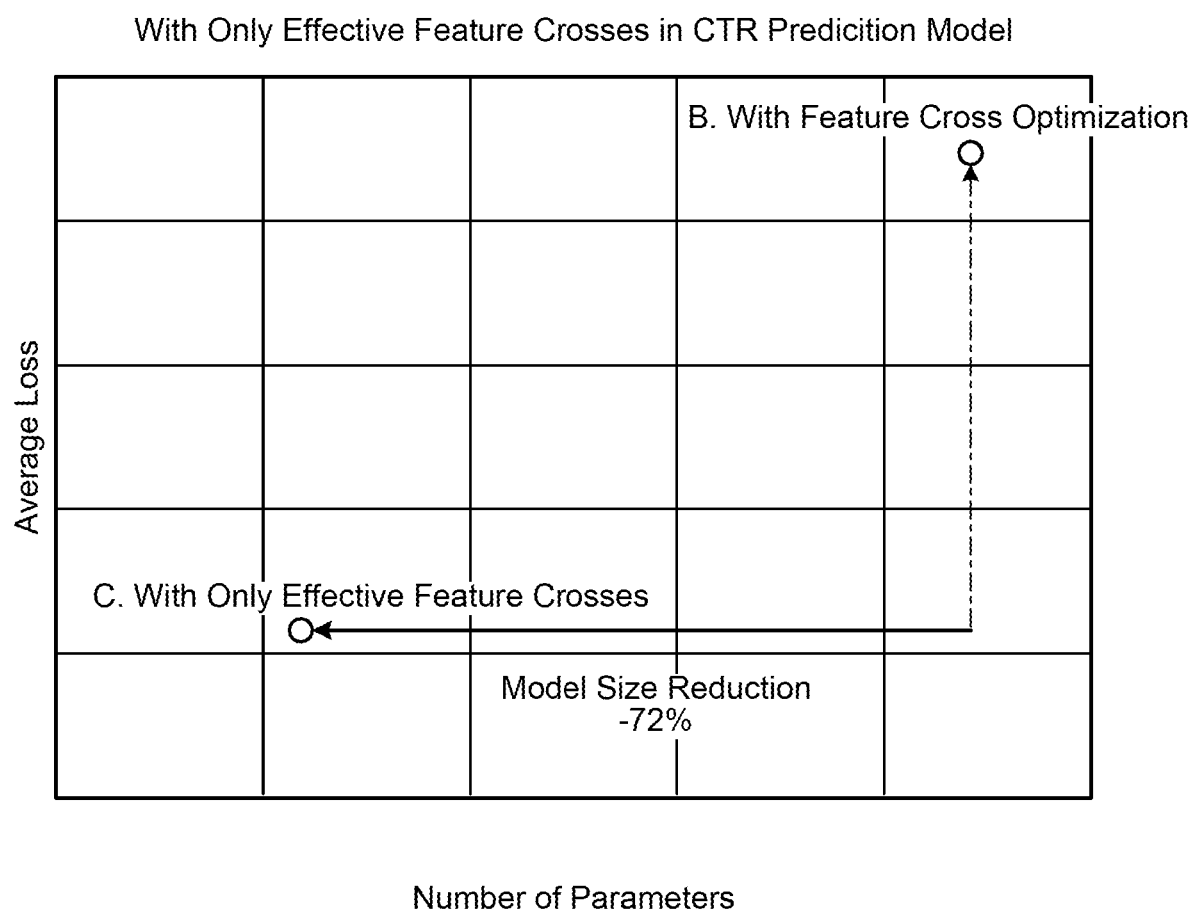
FIG. 11 is a graph illustrating an example of the accuracy of CTR prediction in a model learned using effective feature sets.

Next, the accuracy of CTR prediction in a model learned using effective feature sets will be described with reference to FIG. 11. FIG. 11 is a graph illustrating an example of the accuracy of CTR prediction in a model learned using effective feature sets. In the example illustrated in FIG. 11, average loss values of a model B learned simply using feature sets and a model C using only effective feature sets are plotted, where the vertical axis represents an average loss value and the horizontal axis represents a model size. As illustrated in FIG. 11, it is found that the model C has a lower average loss value and higher accuracy than the model B, even though the model C is less than the model B by approximately 72% in size.

Figure 12:
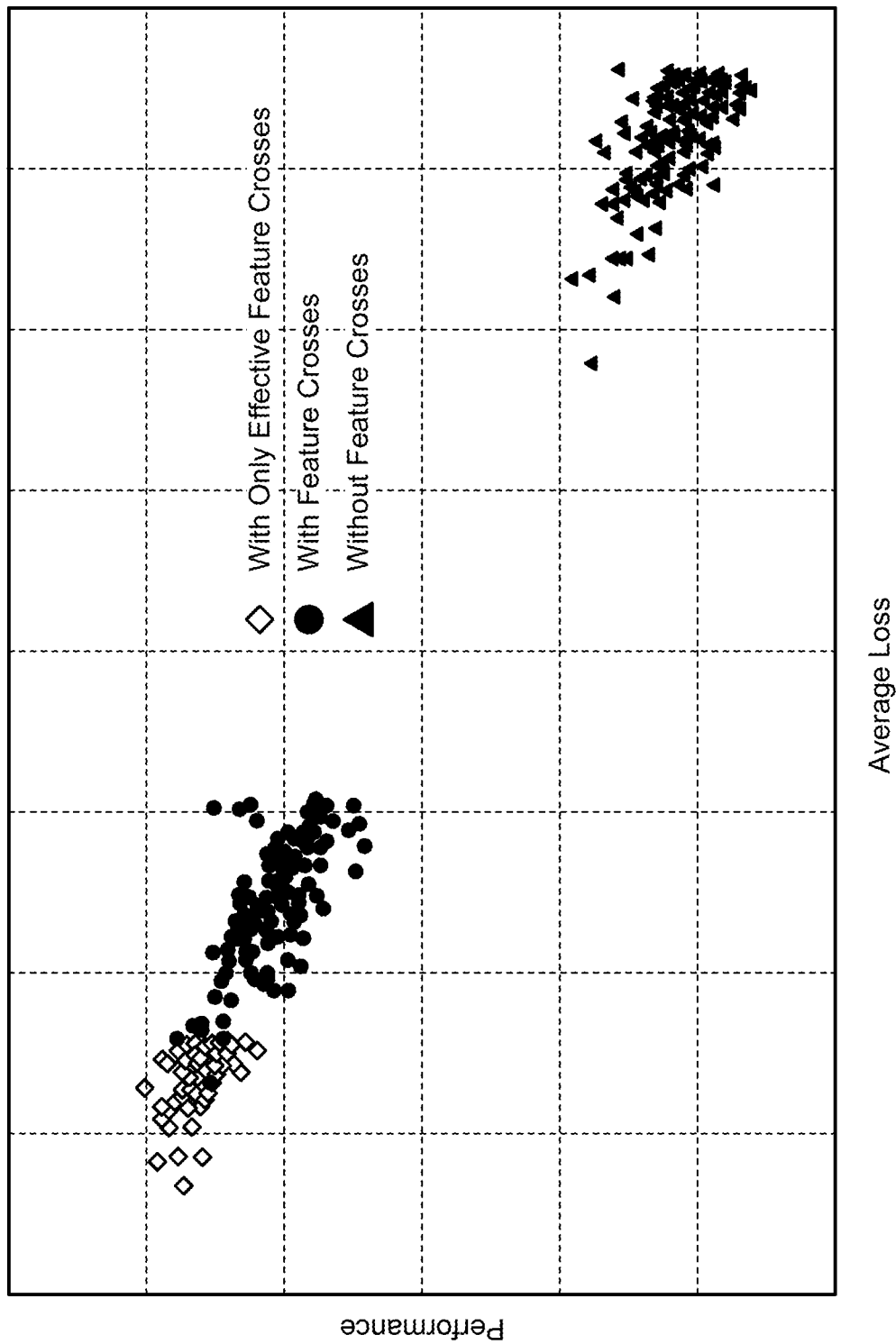
FIG. 12 is a graph illustrating an example of the accuracy of a model learned according to the evaluation results of feature sets.

Next, the accuracy of a model that evaluates feature sets and automatically extracts the feature sets with a high evaluation value to perform learning will be described with reference to FIG. 12. FIG. 12 is a graph illustrating an example of the accuracy of a model learned according to the evaluation results of feature sets. In the example illustrated in FIG. 12, the performance of a model (Without Feature Crosses) not using feature sets, a model (With Feature Crosses) using randomly generated feature sets, and a model (With Only Effective Feature Crosses) learned using feature sets with a high evaluation value are plotted, where the horizontal axis represents an average loss value and the vertical axis represents the accuracy of a model (AUC-ROC). In the example illustrated in FIG. 12, the performance of the model not using feature sets is plotted with triangles, the performance of the model using randomly generated feature sets is plotted with circles, and the performance of the model learned using feature sets with a high evaluation value is plotted with diamonds.

As illustrated in FIG. 12, it is found that the model using feature sets generally has a lower average loss value and higher performance than the model not using feature sets. It is also found that the performance of the model that evaluates feature sets and learns using only feature sets with a high evaluation value is significantly (discontinuously) improved as compared with the performance of the model randomly using feature sets.

As described above, it has been found by the results of various experiments that the accuracy of the model learned using feature sets is improved as compared with the accuracy of the model not using feature sets. In addition, it is found that even if the learning progresses in the model learned using feature sets, saturation is less likely to occur and the accuracy is further improved. It is also found that the accuracy of the model can be further improved and the model size can be reduced by adopting only the effective feature sets among the feature sets.

7. MODIFICATION

An example of the information providing device 10 has been described above. However, the embodiment is not limited thereto. Hereinafter, modifications of the information providing device 10 and various processes performed by the information providing device 10 will be described.

[7-1. Model Generation]

In the example described above, the information providing device 10 generates a model by performing an index generation process and a model generation process. However, the embodiment is not limited thereto. For example, the information providing device 10 may acquire a generated model from another information processing device that performs the index generation process and the model generation process, and perform the learning process and evaluation process described above on the acquired model to generate a model that reflects feature sets, evaluate the feature sets, and extract effective feature sets.

Further, the information providing device 10 may receive the provision of an existing model from a user, for example. In such a case, the information providing device 10 may perform the learning process and evaluation process described above on the received model to generate a model reflecting feature sets, evaluate the feature sets, and extract effective feature sets.

[7-2. Index Generation Process Including Learning Process and Evaluation Process]

In the example described above, the information providing device 10 performs an evaluation process and a learning process by using the model generated as a result of an index generation process and a model generation process. However, the embodiment is not limited thereto. For example, the information providing device 10 optimizes an input feature cross, that is, a feature set to be adopted in the index generation process. In optimizing the input feature cross in such an index generation process, the learning process and evaluation process described above may be performed. In other words, the information providing device 10 may generate a feature set, generate values of the feature set, learn the values of the feature set, make an evaluation based on the results of learning, extract an effective feature set based on the evaluation, and the like in the index generation process.

[7-3. Device Configuration]

While an example in which the information providing system 1 has the information providing device 10 and the model generation server 2 that generates a model has been described in the embodiment, the embodiment is not limited thereto. For example, the information providing device 10 may have a function of the model generation server 2. That is, the information providing device 10 may perform model learning in the information providing device 10. Further, the function exhibited by the information providing device 10 may be included in the terminal device 3. In such a case, the terminal device 3 automatically generates a generation index, and at the same time, performs a process of automatically generating a model using the model generation server 2 and various processes related to feature sets using the generated model.

[7-4. Others]

Among the processes described in the above embodiment, all or a part of the processes described as being automatically performed can be manually performed, or all or a part of the processes described as being manually performed can be automatically performed by known methods. In addition, the process procedures, specific names, and information including various data and parameters, which have been shown in the above documents and drawings, can be freely changed unless otherwise specified. For example, various information illustrated in each drawing is not limited to the illustrated information.

Further, each constituent element of each device illustrated in the drawings is functionally conceptual, and does not necessarily have to be physically configured as illustrated. That is, the specific form of distribution or integration of the respective devices is not limited to that illustrated in the drawings, and all or a part of the devices may be configured to be functionally or physically distributed or integrated in arbitrary units according to various loads or usage conditions.

In addition, the embodiments described above can be appropriately combined within a range that does not contradict the processing contents.

[7-5. Program]

Figure 13:
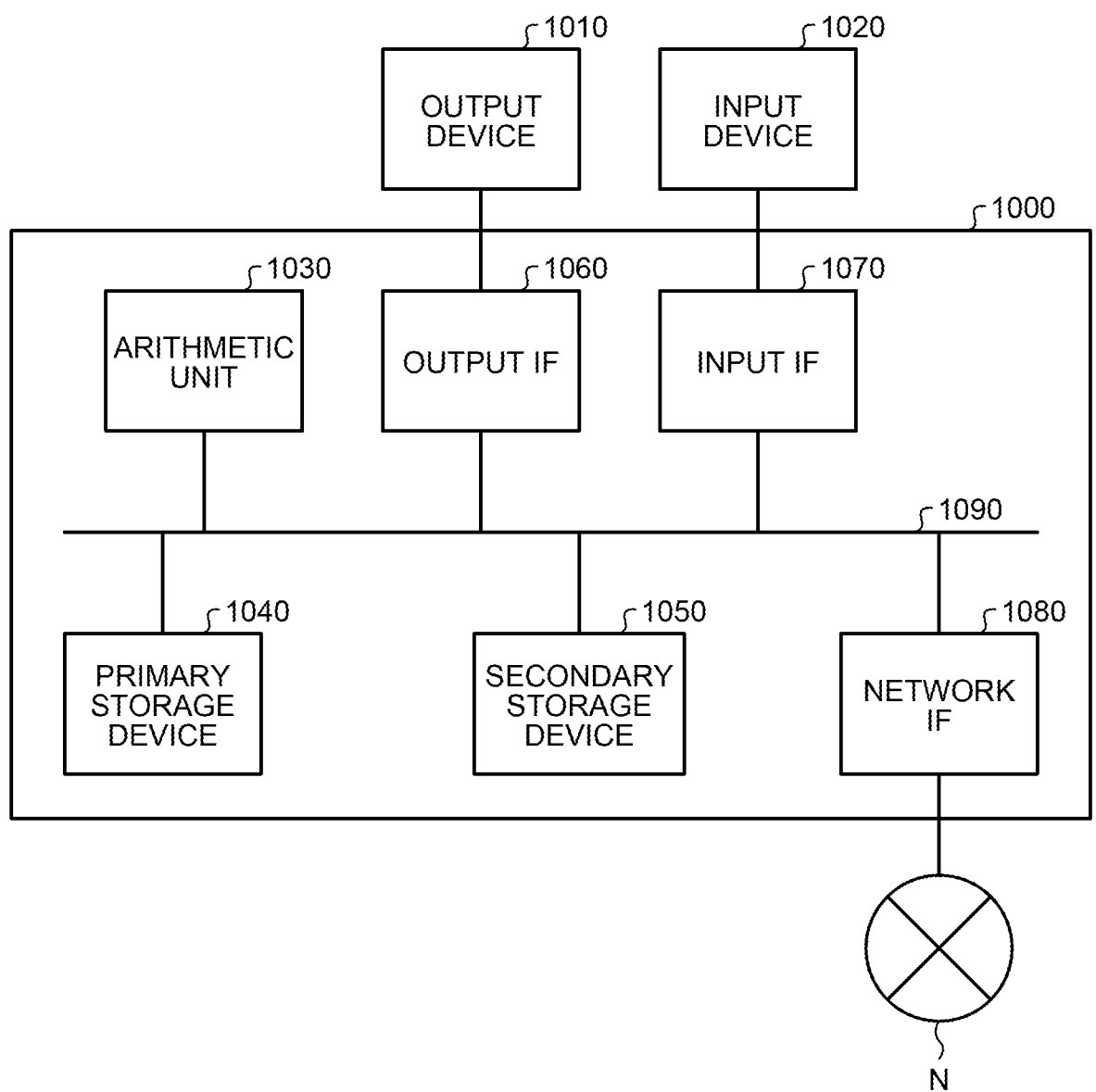
FIG. 13 is a diagram illustrating an example of a hardware configuration.

The information providing device 10 according to the embodiment described above is implemented by, for example, a computer 1000 having a configuration as illustrated in FIG. 13. FIG. 13 is a diagram illustrating an example of a hardware configuration. The computer 1000 is configured to be connected to an output device 1010 and an input device 1020, and is also configured such that an arithmetic unit 1030, a primary storage device 1040, a secondary storage device 1050, an output IF (Interface) 1060, an input IF 1070, and a network IF 1080 are connected by a bus 1090.

The arithmetic unit 1030 operates based on programs stored in the primary storage device 1040 or the secondary storage device 1050, programs read from the input device 1020, or the like to perform various processes. The primary storage device 1040 is a memory device that primarily stores data used by the arithmetic unit 1030 for various calculations, such as a RAM. The secondary storage device 1050 is a storage device in which data used by the arithmetic unit 1030 for various calculations and various databases are registered, and is implemented by a ROM (Read Only Memory), an HDD, a flash memory, or the like.

The output IF 1060 is an interface for transmitting information, which is an output target, to the output device 1010 that outputs various information such as a monitor or a printer. For example, the output IF 1060 is implemented by a standard connector such as such as USB (Universal Serial Bus), DVI (Digital Visual Interface), or HDMI (registered trademark) (High Definition Multimedia Interface). Further, the input IF 1070 is an interface for receiving information from various input devices 1020 such as a mouse, a keyboard, and a scanner, and is implemented by, for example, USB.

The input device 1020 may be, for example, an optical recording medium such as a CD (Compact Disc), a DVD (Digital Versatile Disc), or a PD (Phase change rewritable Disk), a magneto-optical recording medium such as an MO (Magneto-Optical disk), a tape, a magnetic recording medium, or a device that reads information from a semiconductor memory or the like. Alternatively, the input device 1020 may be an external storage medium such as a USB memory.

The network IF 1080 receives data from another device through the network N and transmits the data to the arithmetic unit 1030, or transmits the data generated by the arithmetic unit 1030 to the other device through the network N.

The arithmetic unit 1030 controls the output device 1010 and the input device 1020 through the output IF 1060 and the input IF 1070. For example, the arithmetic unit 1030 loads a program from the input device 1020 or the secondary storage device 1050 onto the primary storage device 1040, and executes the loaded program.

For example, when the computer 1000 functions as the information providing device 10, the arithmetic unit 1030 of the computer 1000 achieves the function of the control unit 40 by executing a program loaded on the primary storage device 1040.

8. EFFECTS

As described above, the information providing device 10 generates, from a plurality of values indicating the features of a predetermined target and indicating different types of a plurality of features, values corresponding to a set of the types of the features. The information providing device 10 then causes a model to learn the features of the predetermined target by using the generated values. As a result of such a process, the information providing device 10 can achieve a model with higher accuracy than a model using each feature individually, and can reduce saturation when the learning progresses.

Further, the information providing device 10 generates, from values of a plurality of features, a value indicating the product of the features. The information providing device 10 also generates, from a value of a first type feature and a value of a second type feature, a value corresponding to a set of the first type feature and the second type feature. As a result of such a process, the information providing device 10 can appropriately cause a model to learn the features of feature sets.

In addition, the information providing device 10 causes a model having the structure of a deep neural network to learn. Consequently, the information providing device 10 can improve the accuracy of a model.

Further, the information providing device 10 generates a set in which the features of a predetermined target are randomly combined, and generate a corresponding value for each generated set. Consequently, the information providing device 10 can find feature sets that are estimated to be related to a classification purpose from various viewpoints.

When the information providing device 10 receives a constraint condition for generating a set from a predetermined operator, the information providing device 10 generates a set in which the features of a predetermined target are combined according to the constraint condition, and generates a value corresponding for each generated set. As a result of such a process, the information providing device 10 can generate, for example, a feature set with the content estimated by the operator to be related to the classification purpose with high possibility.

The information providing device 10 receives the specification of features to be included in each set as a constraint condition, generates a set including at least the specified features, and generates a corresponding value for each generated set. The information providing device 10 also receives the specification of the number of features to be included in each set as a constraint condition, generates a set including the specified number of features, and generates a corresponding value for each generated set. The information providing device 10 also receives the specification of the number of sets to be generated as a constraint condition, generates the specified number of sets, and generates the corresponding value for each generated set. The information providing device 10 also receives the specification of feature candidates as a constraint condition, generates a set in which the specified feature candidates are combined, and generates a corresponding value for each generated set. The information providing device 10 also receives the specification of the input mode when feature set values are input to a model as a constraint condition, and performs model learning by inputting feature set values to the model in the specified input mode.

As a result of the various processes described above, the information providing device 10 can achieve a trial of the learning process using various feature sets in various modes in the manner desired by the operator.

The information providing device 10 evaluates a feature set based on the results of learning, and performs model learning using the values of the feature set whose evaluation results satisfy a predetermined condition. For example, the information providing device 10 performs model learning by using values corresponding to the feature set whose evaluation results exceed a predetermined threshold value. Alternatively, for example, the information providing device 10 removes feature sets whose evaluation results are lower than a predetermined threshold value from feature sets whose values are used for model learning. As a result of such a process, the information providing device 10 can perform model learning using more effective feature sets. In addition, the information providing device 10 can further improve the accuracy of the model.

The information providing device 10 evaluates a feature set based on the amount of improvement of a model learned using values of the feature set with respect to a model learned without using the values of the feature set. Consequently, the information providing device 10 can properly extract more effective feature sets.

In addition, the information providing device 10 generates values corresponding to a plurality of sets in which different features are combined, learns a model learned using values corresponding to all the sets as a reference model and also learns a plurality of models learned without using the values corresponding to the respective sets, and evaluates a predetermined set based on the difference between the average loss value of the model learned without using values corresponding to the predetermined set and the average loss value of the reference model. Consequently, the information providing device 10 can properly evaluate whether or not the feature set is effective.

The information providing device 10 also generates a value corresponding to a new feature set different from a feature set whose evaluation results satisfy a predetermined condition, learns a model using values corresponding to the feature set whose evaluation results satisfy the predetermined condition and the new feature set different from the feature set whose evaluation results satisfy the predetermined condition, and evaluates each feature set based on the results of learning. As a result of such a process, the information providing device 10 can automatically find an effective feature set.

The information providing device 10 also generates a new feature set based on the feature set whose evaluation results satisfy the predetermined condition, and generates a value corresponding to the generated feature set. For example, the information providing device 10 generates a new feature set including features included in a feature set whose evaluation results exceed a predetermined threshold value. For example, the information providing device 10 also generates a new feature set that does not include features included in a feature set whose evaluation results are lower than a predetermined threshold value. As a result of such a process, the information providing device 10 can automatically and efficiently generate an effective feature set.

The information providing device 10 also acquires the amount of improvement in accuracy when the model is caused to learn the features of values corresponding to a plurality of types of feature sets generated from a plurality of values corresponding to a plurality of types of features, that is, values corresponding to different feature sets. The information providing device 10 then evaluates the feature set based on the amount of improvement. As a result of such a process, the information providing device 10 can present to a user a feature set that is effective for the accuracy of the model or a feature set that is not effective for the accuracy of the model.

Although some of the embodiments of the present application have been described in detail with reference to the drawings, these are examples, and the present invention may be carried out by other embodiments in which various modifications and improvements are made based on the knowledge of those skilled in the art, including the embodiments described in the summary of the invention.

In addition, "section", "module", and "unit" can be read as "means" or "circuit". For example, a distribution unit can be read as a distribution means or a distribution circuit.

What is claimed is:

1. A model learning method, comprising:
   receiving, by a processor, a constraint condition for generating a first plurality of feature sets from learning data;
   generating, by the processor, the first plurality of feature sets according to the constraint condition;
   generating, by the processor, a first plurality of values that corresponds to the first plurality of feature sets;
   receiving, by a server, the first plurality of values to generate a first plurality of models and providing the first plurality of models to the processor;
   evaluating, by the processor, performance of the first plurality of models;
   generating, by the processor, a second plurality of feature sets from a subset of the first plurality of feature sets based on the performance of the first plurality of models;
   generating, by the processor, a second plurality of values that corresponds to the second plurality of feature sets;
   receiving, by the server, the second plurality of values to generate a second plurality of models and providing the second plurality of models to the processor;
   evaluating, by the processor, performance of the second plurality of models;
   determining, by the processor, whether a predetermined condition is satisfied based on evaluated performance of the second plurality of models; and
   for the predetermined condition being satisfied, providing, by the processor, a highest performing model from the second plurality of models.

2. The method of claim 1, wherein the evaluating the performance of the first plurality of models comprises comparing an average loss value of each of the first plurality of models against an average loss value of a reference model derived from the first plurality of values,
   wherein the evaluating the performance of the second plurality of models comprises comparing an average loss value of each of the second plurality of models against an average loss value of a second reference model derived from the second plurality of values.

3. The method of claim 1, wherein the processor is further configured to receive a specification of a feature to be included in each of the first plurality of feature sets as the constraint condition.

4. The method of claim 1, wherein the processor is further configured to receive a specification of a number of features to be included in each of the first plurality of feature sets as the constraint condition.

5. The method of claim 1, wherein the processor is further configured to receive a specified number of feature sets to be generated as the first plurality of feature sets as the constraint condition.

6. The method of claim 1, wherein the generating the second plurality of feature sets from the subset of the first plurality of feature sets comprises:

selecting, by the processor, a predetermined number of highest performing feature sets from the first plurality of feature sets; and selecting, by the processor, additional feature sets not included in the first plurality of features sets, wherein the second plurality of feature sets comprises the predetermined number of highest performing feature sets from the first plurality of feature sets and the additional feature sets.

7. The method of claim 1, further comprising:

for the predetermined condition being determined as not satisfied, performing:

generating, by the processor, a third plurality of feature sets from a subset of the second plurality of feature sets based on the performance of the second plurality of models;

generating, by the processor, a third plurality of values that corresponds to the third plurality of feature sets;

receiving, by the server, the third plurality of values to generate a third plurality of models and providing the third plurality of models to the processor;

evaluating, by the processor, performance of the third plurality of models;

determining, by the processor, whether the predetermined condition is satisfied based on evaluated performance of the third plurality of models; and for the predetermined condition being satisfied based on the evaluated performance of the third plurality of models, providing, by the processor, a highest performing model from the third plurality of models.

8. The method of claim 7, further comprising:

for the predetermined condition being determined as not satisfied based on the evaluated performance of the third plurality of models, iteratively performing, until the predetermined condition is satisfied, feature set generation, value set generation, model generation, and model evaluation from preceding feature sets.

* * * * *